US007003857B1

(12) United States Patent
Shimada et al.

(10) Patent No.: US 7,003,857 B1
(45) Date of Patent: Feb. 28, 2006

(54) METHOD OF PRODUCING AN INK-JET PRINTING HEAD

(75) Inventors: Masato Shimada, Nagano (JP); Tetsushi Takahashi, Nagano (JP); Tsutomu Nishiwaki, Nagano (JP); Tsutomu Hashizume, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 881 days.

(21) Appl. No.: 09/599,440

(22) Filed: Jun. 22, 2000

Related U.S. Application Data

(62) Division of application No. 09/107,276, filed on Jun. 30, 1998, now Pat. No. 6,126,279, which is a division of application No. 08/756,254, filed on Nov. 25, 1996, now Pat. No. 6,019,458.

(30) Foreign Application Priority Data

| | | |
|---|---|---|
| Nov. 24, 1995 | (JP) | 7-306198 |
| Mar. 14, 1996 | (JP) | 8-57950 |
| Oct. 25, 1996 | (JP) | 8-284487 |
| Nov. 18, 1996 | (JP) | 8-306373 |

(51) Int. Cl.
*H04R 17/00* (2006.01)
*B23D 53/76* (2006.01)

(52) U.S. Cl. ...................... 29/25.35; 29/890.1; 29/846; 29/847; 29/852; 219/121.69; 310/321

(58) Field of Classification Search ............... 29/25.35, 29/847, 890.1, 846, 852; 317/70–92, 54, 317/47; 219/121.69; 427/100; 252/62.92; 310/321, 325, 327
See application file for complete search history.

(56) References Cited

U.S. PATENT DOCUMENTS

| | | | | |
|---|---|---|---|---|
| 4,312,008 A | | 1/1982 | Taub et al. | 347/71 |
| 4,445,256 A | * | 5/1984 | Huguenin | 29/25.35 |
| 5,265,315 A | | 11/1993 | Hoisington et al. | 29/25.35 |
| 5,359,760 A | * | 11/1994 | Busse | 29/25.35 |
| 5,396,042 A | | 3/1995 | Ishida et al. | |
| 5,459,501 A | * | 10/1995 | Lee | 347/68 |
| 5,534,900 A | | 7/1996 | Ohno et al. | 347/54 |
| 5,612,511 A | * | 3/1997 | Meyer | 174/254 |
| 5,754,205 A | | 5/1998 | Miyata et al. | 347/71 |
| 5,896,150 A | | 4/1999 | Kobayashi | 347/71 |
| 5,915,763 A | * | 6/1999 | Masuda | 29/890.1 |
| 5,988,800 A | | 11/1999 | Ema et al. | 347/70 |
| 6,056,392 A | * | 5/2000 | Matsumoto | 347/59 |

FOREIGN PATENT DOCUMENTS

| | | |
|---|---|---|
| EP | 0519403 A2 | 12/1992 |
| GB | 2 232 933 A | 1/1991 |
| GB | 2232933 A | 1/1991 |

(Continued)

*Primary Examiner*—A. Dexter Tugbang
(74) *Attorney, Agent, or Firm*—Sughrue Mion, PLLC

(57) ABSTRACT

An ink-jet printing head comprises: a pressurizing chamber substrate having first and second sides opposing each other; a plurality of pressurizing chambers formed on the first side of the pressurizing chamber substrate; channels formed on the second side of the pressuring chamber substrate to be opposite to the pressuring chambers, respectively; oscillating plate films for pressurizing ink within the respective pressurizing chambers; and piezoelectric thin-film elements, each having upper and lower electrodes and a piezoelectric film sandwiched between the upper and lower electrodes, the piezoelectric thin-film being formed in the channel, wherein at least the upper electrode is formed to have a narrower width than that of the pressurizing chamber. And a method for producing the ink-jet head.

21 Claims, 17 Drawing Sheets

FOREIGN PATENT DOCUMENTS

| | | | |
|---|---|---|---|
| JP | 356113470 | * | 9/1981 |
| JP | 57-063270 | A | 4/1982 |
| JP | 57-201665 | | 12/1982 |
| JP | 2-301445 | | 12/1990 |
| JP | 3-297653 | | 12/1991 |
| JP | 4-169237 | | 6/1992 |
| JP | 6-171098 | | 6/1992 |
| JP | 4-251748 | | 9/1992 |
| JP | 5-504740 | | 7/1993 |
| JP | 5-338155 | | 12/1993 |
| JP | 6-23986 | | 1/1994 |
| JP | 6-71894 | | 3/1994 |
| JP | 6-87217 | | 3/1994 |
| JP | 6-134983 | | 5/1994 |
| JP | 07-137266 | A | 5/1995 |
| JP | 7-178909 | | 7/1995 |
| JP | 4-99636 | | 7/1997 |

* cited by examiner

WATER CLEANING

LAYER-TO-BE-PROCESSED FORMATION

RESIST APPLICATION

EXPOSURE

DEVELOPMENT

ETCHING

RESIST REMOVAL

SILICON ETCHING

THERMAL OXIDE FILM ETCHING

FILM-TO-BE-PROCESSED FORMATION

OSCILLATING PLACE FILM FORMATION

PIEZOELECTRIC SUBSTRANCE FORMATION

RESIST FORMATION

MASK EXPOSURE

DEVELOPMENT

ETCHING

METHOD OF PRODUCING AN INK-JET PRINTING HEAD

This is a divisional of application Ser. No. 09/107,276 filed Jun. 30, 1998, now U.S. Pat. No. 6,126,279 which is a divisional of Ser. No. 08/756,254 filed on Nov. 25, 1996, now U.S. Pat. No. 6,019,458 the disclosure of which is incorporated herein by reference.

BACKGROUND OF THE INVENTION

The present invention relates to an on-demand ink-jet printing head that squirts ink from nozzles to form dots on recording paper. More particularly, the present invention relates to a piezoelectric ink-jet printing head that squirts ink by applying electric energy to a piezoelectric element, so that an oscillating plate is deflected to apply a pressure to a pressurizing chamber having ink stored therein, and further relates to a method of manufacturing the piezoelectric ink-jet printing head.

An ink-jet printing head using a thin-film piezoelectric element is disclosed in the specification of, e.g., U.S. Pat. No. 5,265,315.

FIG. 20 shows the cross section of the principle element of a conventional ink-jet printing head. This cross-sectional view shows the principle element of the ink-jet head printer head taken in a transverse direction of an elongated pressurizing chamber.

The principle element of the ink-jet printing head is formed by bonding together a pressuring chamber substrate 500 and a nozzle substrate 508. The pressurizing chamber substrate 500 comprises a silicon monocrystalline substrate 501 having a thickness of about 150 μm. An oscillating plate film 502, a lower electrode 503, a piezoelectric film 504, and an upper electrode 505 are formed, in that order, on the silicon monocrystalline substrate 501. Pressurizing chambers 506*a*–506*c* are formed deep in the silicon monocrystalline substrate 501 in a thicknesswise direction thereof by etching. Nozzles 509*a*–509*c* are formed in the nozzle substrate 508 so as to correspond to the pressurizing chambers 506*a* to 506*c*, respectively.

The technique of manufacturing such an ink-jet printing head is disclosed in the specification of U.S. Pat. No. 5,265,315. In the steps of manufacturing the pressuring chamber substrate, a silicon monocrystalline substrate (i.e. a wafer) having a thickness of about 150 μm is divided into unit areas, each of which is formed into the pressurizing chamber substrate. A flexible oscillating plate film for use in applying a pressure to the pressurizing chamber is laminated to one side of the wafer. Piezoelectric films that generate a pressure are integrally formed on the oscillating plate film so as to correspond to the pressurizing chambers by thin-film manufacturing methods such as a sputtering method or a sol-gel method. The other side of the wafer is repetitively subjected to formation of a resist mask and etching. As a result, a set of pressurizing chambers partitioned by side walls are formed. Each side wall has a width of 130 μm and has the same height as the thickness of the wafer. By virtue of the above-described manufacturing method, the pressurizing chambers 506*a* to 506*c*, each of which has a width of 170 μm, are formed. For example, in a conventional ink-jet printing head, a row of nozzles 509, each of which has a resolution of about 90 dpi (dot/inch), are directed to the recording paper at an angle of 33.7 degrees, thereby achieving a print recording density of 300 dpi.

FIG. 21 is a schematic representation of the operating principle of the conventional ink-jet printing head. This representation shows the electrical connections of the principle element of the ink-jet printing head shown in FIG. 20. One electrode of a drive voltage source 513 is connected to the lower electrode 503 of the ink-jet printing head through an electrical wiring 514. The other electrode of the drive voltage source 513 is connected to the upper electrode 505 that correspond to the pressurizing chambers 506*a* to 506*c* through an electrical wiring 515 and switches 516*a* to 516*c*.

In the drawing, only the switch 516*b* of the pressurizing chamber 506*b* is closed, and the other switches 516*a* and 516*c* are open. The pressurizing chamber 506*c* having the switch 516 opened is waiting to squirt ink. The switch 516*a* is closed at the time of a squirting operation (see 516*b*). A voltage is applied to polarize the piezoelectric film 504 in the direction as designated by A. In other words, a voltage which is the same as the voltage applied to cause polarization in polarity is applied. Then, the piezoelectric film 504 expands in its thicknesswise direction, as well as contracting in the direction perpendicular to the thicknesswise direction. As a result of the expansion and contraction of the piezoelectric film, a shearing stress acts on the boundary between the piezoelectric film 504 and the oscillating plate film 502, so that the oscillating plate film 502 and the piezoelectric film 504 deflect downwardly in the drawing. As a result of the deflection, the volume of the pressurizing chamber 506*b* is reduced, so that an ink droplet 512 is squirted from the nozzle 509*b*. If the switch 516 is opened again (see 516*a*), the deflected oscillating plate film 502 will be restored to its original state, thereby expanding the volume of the pressurizing chamber. Consequently, the pressurizing chamber 506*a* is filled with ink through an unillustrated ink supply channel.

However, the following problems are encountered in improving the print recording density with use of the structure of the example of the conventional ink-jet printing head.

First, it was difficult to improve recording density. A demand for high-resolution printing is increasing day by day with respect to an ink-jet printer. To respond to this demand, it is inevitable to increase the density of nozzles by reducing the quantity of ink to be squirted from one nozzle of the ink-jet printing head. If the nozzles are tilted in the direction of scanning, the print density will be further improved. The pressurizing chambers and the nozzles are arranged on the same pitches, and hence it is necessary to increase the density of the pressurizing chambers, i.e., it is necessary to integrate the pressurizing chambers, in order to realize high-resolution printing. For example, in the case of an ink-jet printing head having a resolution of 180 dpi, it is necessary to array the pressurizing chambers on a pitch of about 140 μm. More specifically, as a result of optimizing calculation of an ink squirting pressure and the amount of ink to be squirted, a pressuring chamber having a width of about 100 μm and a side wall of the pressurizing chamber having a thickness of about 40 μm are ideal.

There are structural limitations on the side wall of the pressurizing chamber. Specifically, if the side wall is too high compared to its width, the rigidity of the side wall will become insufficient when a pressure is applied to one pressurizing chamber. If the rigidity of the side wall becomes insufficient, the side wall deflects, which in turn causes an adjacent pressurizing chamber, originally supposed not to squirt ink, to squirt ink (this phenomenon will hereinafter be referred to as "crosstalk"). For example, if a pressure is applied to the pressurizing chamber 506*b*, as shown in FIG. 21, the side walls deflect in the direction designated by B because of deficiency of rigidity of the side walls 507*a* and 507*b*. In turn, the pressure of the pressurizing chambers 506*a* and 506*c* also increase, and therefore the nozzles 509*a* and 509*c* also squirt ink. The thickness of the side wall becomes smaller as the resolution of the ink-jet printing head increases, as a result of which the above-described phenomenon becomes more noticeable.

It is only necessary to increase the thickness of the side wall in order to prevent the crosstalk phenomenon. However, it is impossible to excessively increase the thickness of the side wall in order to respond to the demand for improved resolution of the ink-jet printing head.

In contrast, it is also possible to prevent the crosstalk phenomenon by reducing the height of the side wall compared to its thickness. However, in order to safely handle the wafer during the manufacturing step, the wafer is required to possess sufficient mechanical strength. Therefore, the wafer must have a predetermined thickness. For example, in the case of a silicon substrate having a diameter of 4 inches ϕ, a resultant wafer will deflect or will become very difficult to handle during the manufacturing step if the thickness of the wafer is reduced to becomes less than 150 μm.

For these reasons, it was difficult to prevent the crosstalk while improving a resolution as well as ensuring the rigidity of the side wall.

Second, it was difficult to manufacture an inexpensive ink-jet printing head from the industrial viewpoint. To reduce the piece rate of the ink-jet printing head, all that needs to be done is to increase the number of pressurizing chamber substrates which can be formed at one time by increasing the area of the wafer (to e.g., a diameter of 6 or 8 inches ϕ). However, as previously described, it is necessary to increase the thickness of the wafer in order to ensure its required mechanical strength as the area of the wafer increases. If the thickness of the wafer increases, it becomes impossible to prevent the crosstalk, as having been previously described.

SUMMARY OF THE INVENTION

In view of the foregoing problems, a first object of the present invention is to provide an ink-jet printing head capable of preventing crosstalk by increasing the rigidity of the side wall of the pressurizing chamber, and a method of manufacturing the ink-jet printing head.

A second object of the present invention is to provide a method of manufacturing an ink-jet printing head which allows an increase in the area of a silicon monocrystalline substrate.

An invention is applied to an ink-jet printing head having a plurality of pressurizing chambers formed on one side of a pressurizing chamber substrate. Channels are formed on the other side of the pressuring chamber substrate opposite to the side having the pressurizing chambers formed thereon in such a way as to be opposite to the pressuring chambers, respectively. In each channel, an oscillating plate film for pressurizing ink within the pressurizing chamber is formed. A piezoelectric thin-film element consisting of a piezoelectric film sandwiched between upper and lower electrodes is formed on each oscillating plate film. At least the upper electrode is formed to have a narrower width than that of the pressurizing chamber.

Specifically, the pressuring chamber substrate is a silicon monocrystalline substrate of (100) orientation. The wall surfaces of side walls which separate the plurality of pressurizing chambers from each other form an obtuse angle with respect to the bottom of the pressurizing chamber. The wall surface of the side wall is made of a (111) plane of a silicon monocrystalline substrate.

Furthermore, the wall surfaces of the channels formed on the side of the pressuring chamber substrate opposite to the side having the pressuring chambers formed thereon, form an obtuse angle with respect to the bottom of the pressurizing chamber. The wall surface of the side wall is made of the (111) plane of the silicon monocrystalline substrate.

Alternatively, the pressuring chamber substrate is made of a silicon monocrystalline substrate of (110) orientation. The wall surfaces of side walls which separate the plurality of pressurizing chambers from each other form a substantial right angle with respect to the bottom of the pressurizing chamber. The wall surface of the side wall is made of a (111) plane of a silicon monocrystalline substrate.

Furthermore, the wall surfaces of the channels formed on the side of the pressuring chamber substrate opposite to the side having the pressuring chambers formed thereon, form a substantial right angle with respect to the bottom of the pressurizing chamber. The wall surface of the side wall is made of the (111) plane of the silicon monocrystalline substrate.

Alternatively, the wall surfaces of the channels formed on the side of the pressuring chamber substrate opposite to the side having the pressuring chambers formed thereon, form an obtuse angle with respect to the bottom of the pressurizing chamber.

Specifically, the lower electrode doubles as the oscillating plate film.

According to another aspect of the invention, there is provided a method of manufacturing an ink-jet printing head, comprising the steps of: forming a plurality of channels in one side of a silicon monocrystalline substrate; forming an oscillating plate film on the bottom of each channel; forming a piezoelectric thin-film element which consists of a piezoelectric film sandwiched between upper and lower electrodes, on the oscillating plate film; and forming pressuring chambers in the opposite side of the silicon monocrystalline substrate so as to be opposite to the channels, respectively.

Furthermore, the step of manufacturing the piezoelectric thin-film element comprises the steps of: forming the lower electrode; forming the piezoelectric film on the lower electrode; forming the upper electrode on the piezoelectric film; and removing a portion of the upper electrode to make the effective width of the upper electrode narrower than the width of the pressurizing chamber.

Still further, the step of manufacturing the piezoelectric film comprises the steps of: forming a piezoelectric film precursor; and subjecting the piezoelectric film precursor to a heat treatment in an atmosphere including oxygen so as to change the piezoelectric film precursor to the piezoelectric film.

Still further, the step of removing a portion of the upper electrode so as to make the effective width of the upper electrode narrower than the width of the pressurizing chamber comprises the steps of: forming a pattern of etching mask material which acts as a mask to an etching substance, in the areas of the upper electrode which are desired to leave; and etching away the areas of the upper electrode that are not covered with the etching mask material.

Additionally, the step of removing a portion of the upper electrode so as to make the effective width of the upper electrode narrower than the width of the pressurizing chamber comprises the step of: removing a portion of the upper electrode by irradiating the areas of the upper electrode desired to remove with a laser beam.

According to still further aspect of the invention, there is provided an ink-jet printing head having a plurality of pressurizing chambers formed on one side of a pressurizing chamber substrate. The pressurizing chamber substrate has a recess on one side thereof so as to leave a peripheral area. The pressurizing chambers are formed in the thus-formed recess. As a result, The thickness of the peripheral area of the pressurizing chamber substrate is formed to be greater than the thickness of side walls that separate the plurality of pressurizing chambers from each other.

By virtue of this invention, the thick peripheral area is left in the form of a matrix in each unit area. Therefore, even in the case of a silicon monocrystalline substrate having pressurizing chamber substrates formed thereon, a high strength of the silicon monocrystalline substrate itself is ensured. As a result, it becomes easy to handle the silicon monocrystalline substrate during manufacturing steps. Further, by virtue of the present invention, the mechanical strength of the silicon monocrystalline substrate can be increased. Therefore, the area of the silicon monocrystalline substrate is increased to permit formation of an increased number of pressuring chamber substrates.

Furthermore, a nozzle plate is fitted to the recess.

Still further, the ink-jet printing head having the plurality of pressurizing chambers formed on one side of the pressurizing chamber substrate, comprises: stoppers formed on the side of the pressuring chamber substrate having the pressurizing chambers formed thereon; and receiving sections for receiving the stoppers which are formed on the nozzle plate to be bonded to the side having the pressuring chambers formed.

Still further, the difference "d" between the thickness of the peripheral area of the pressurizing chamber substrate and the height of the side wall that is a partition between the pressurizing chambers, forms a relationship $g \geqq d$ with respect to a distance "g" from the border between the recess and the peripheral area to the side wall of the pressurizing chamber in the closest proximity to the border.

According to still further aspect of the invention, there is provided a method of manufacturing an ink-jet printing head comprised of a plurality of pressurizing chamber substrates formed on a silicon monocrystalline substrate, each pressurizing chamber substrate having a plurality of pressurizing chambers formed on one side thereof, comprising: a recess formation step that includes the steps of partitioning the silicon monocrystalline substrate into unit areas to be used in forming the pressurizing chamber substrate, and forming a recess in the side of the pressurizing chamber substrate in which the pressuring chambers are to be formed, for each unit area so as to leave a peripheral area along the circumference of the recess; and a pressurizing chamber formation step that includes the steps of further forming the pressurizing chambers in the recess formed in the recess formation step, and making the thickness of the peripheral area of the pressuring chamber substrate greater than the height of a side wall for separating the pressurizing chambers from each other.

According to still further aspect of the invention, there is provided a method of manufacturing an ink-jet printing head comprised of a plurality of pressurizing chamber substrates formed on a silicon monocrystalline substrate, each pressurizing chamber substrate having a plurality of pressurizing chambers formed on one side thereof, comprising: a pressurizing chamber formation step that includes the steps of partitioning the silicon monocrystalline substrate into unit areas to be used in forming the pressurizing chamber substrate, and forming pressurizing chambers in the side of the pressurizing chamber substrate in which the pressuring chambers are to be formed, while leaving a peripheral area along the circumference of the unit area; and a recess formation step that includes the steps of further forming a recess in the area where the pressurizing chambers are formed in the pressurizing chamber formation step, and making the thickness of the peripheral area of the pressuring chamber substrate greater than the height of a side wall for separating the pressurizing chambers from each other.

According to still further aspect of the invention, there is provided a method of manufacturing an ink-jet printing head comprised of a plurality of pressurizing chamber substrates formed on a silicon monocrystalline substrate, each pressurizing chamber substrate having a plurality of pressurizing chambers formed on one side thereof. The unit of area in which pressurizing chamber substrates are formed on one silicon monocrystalline substrate is referred to as a unit area. A recess is formed on the side of the pressurizing chamber substrate opposite to the side where pressurizing chambers are formed. The recess is an area where a recess is formed so as to leave a peripheral area along it for each unit area.

Consequently, the thickness of the peripheral area of the pressurizing chamber substrate becomes greater than the thickness of the pressuring chamber substrate in the recess. The thick peripheral area is left in the form of a matrix in each unit area. Therefore, in the case of a silicon monocrystalline substrate having pressuring chamber substrates formed thereon, a high strength of the silicon monocrystalline substrate is ensured. As a result, it becomes easy to handle the silicon monocrystalline substrate during manufacturing steps. Further, by virtue of the present invention, the mechanical strength of the silicon monocrystalline substrate can be increased. Therefore, the area of the silicon monocrystalline substrate is increased to permit formation of an increased number of pressuring chamber substrates.

The pressurizing chambers are formed on the side of the pressurizing chamber substrate opposite to the side where the recess is to be formed, by use of an ordinary manufacturing method. The pressurizing chambers are spaces for use in squirting ink and are formed through processing, i.e., formation of a resist, formation of a mask, exposure, development, and etching.

Furthermore, the step of forming a recess further comprises: i) a layer-to-be-processed formation step for forming a layer to be processed; ii) a resist mask formation step for providing the layer to be processed with a resist and patterning the resist; iii) an etching step for etching the layer to be processed corresponding to the recess masked in the resist mask formation step; iv) a recess etching step for forming the recess by further etching the area of the silicon monocrystalline substrate from which the layer to be processed has been removed as a result of the etching step; and v) a step for forming a layer to be processed in the recess etched in the recess etching step.

Still further, a piezoelectric thin film sandwiched between electrode layers is formed in the recess in a piezoelectric thin film formation step. This piezoelectric thin film is etched to form a piezoelectric thin film element. A resist is formed on the piezoelectric thin film by means of an elastic roller (by means of e.g., the roll coating method). Subsequently, the wafer having the resist formed thereon is exposed in an exposure step, and the thus-exposed wafer is developed in a development step. Through these steps, the resist (it may be negative or positive) for use in forming the piezoelectric thin-film element is left on the piezoelectric thin film. The piezoelectric thin film is etched in an etching step, whereby the piezoelectric thin-film element is formed. In the pressurizing chamber formation step, the pressurizing chambers are formed on the side of the recess opposite to the side having the piezoelectric thin-film elements formed thereon so as to be opposite to the piezoelectric thin-film elements, by etching.

After completion of formation of the pressurizing chamber substrates, these pressurizing chamber substrates need to be separated. At this time, it is desirable to separate the pressurizing chamber substrates piece by piece by slicing only the recess that does not include the peripheral area. Further, the pressurizing chamber substrates may also be separated from each other so as to include the peripheral area. As a result, the thus-separated each pressurizing chamber substrate becomes larger in thickness in the peripheral area but smaller in thickness in the recess. This pressurizing chamber substrate can be attached to the base of the ink-jet head printer, exactly as it is.

DETAILED DESCRIPTION OF THE PREFERRED EMBODIMENTS

Best embodiments of the present invention will be described upon reference to the accompanying drawings.

<First Aspect>

A first aspect of the embodiment is intended to prevent crosstalk by forming channels in the side of a silicon monocrystalline substrate opposite to the side where pressurizing chambers are formed, so as to be opposite to the pressurizing chambers.

(Construction of an Ink-jet Head Printer)

Figure 1:
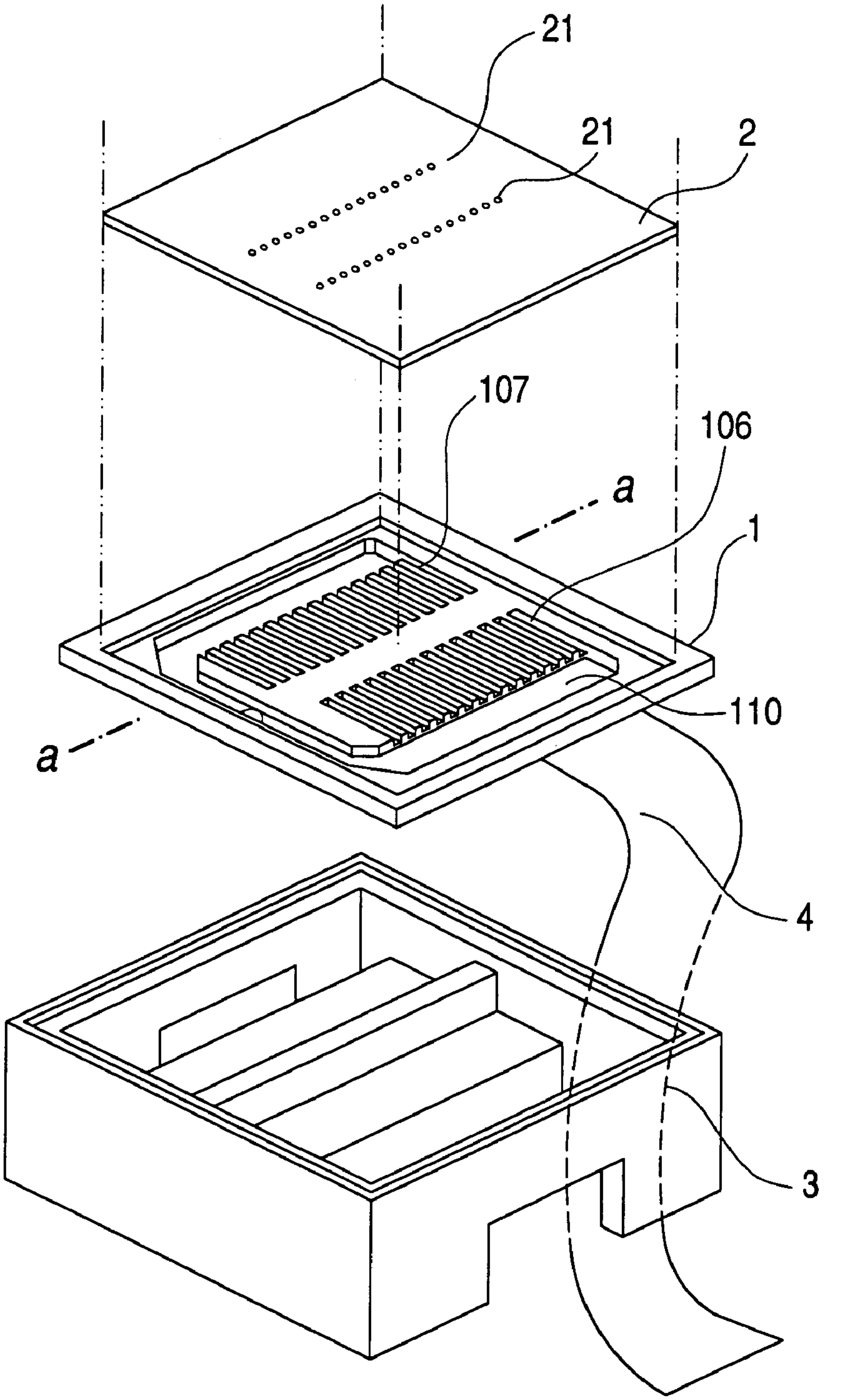
FIG. 1 is an exploded perspective view of an ink-jet printing head according to a first aspect of practice of the present invention.

FIG. 1 is a perspective view of the overall construction of an ink-jet printing head of the present invention. The type of ink-jet head printer having a common ink flow path formed in the pressurizing chamber substrate is shown herein.

As shown in FIG. 1, the ink-jet printing head comprises a pressurizing chamber substrate 1, a nozzle unit 2, and a base 3 on which the pressurizing chamber substrate 1 is mounted.

The pressurizing chamber substrates 1 are formed on a silicon monocrystalline substrate (hereinafter referred to as a "wafer") by a manufacturing method of the present invention, and they are separated to each piece. The method of manufacturing the pressuring chamber substrate 1 will be described later in detail. A plurality of slit-shaped pressurizing chambers 106 are formed in the pressuring chamber substrate 1. The pressuring chamber substrate 1 is provided with a common flow path 110 for supplying ink to all of the pressurizing chambers 106. These pressurizing chambers 106 are separated from each other by side walls 107. Piezoelectric thin-film elements (which will be described later) for applying a pressure to an oscillating plate film are formed on the side of the pressurizing chamber substrate 1 facing the base 3 (i.e., the side of the pressurizing chamber substrate that is not shown in FIG. 1).

The nozzle unit 2 is bonded to the pressurizing chamber substrate 1 so as to cover it with a lid. When the pressurizing chamber 1 and the nozzle unit 2 are bonded together, nozzles 21 for squirting ink droplets are formed in the nozzle unit 2 so as to correspond to the pressurizing chambers 106. An unillustrated piezoelectric thin-film element is disposed in each pressurizing chamber 106. An electrical wire connected to an electrode of each piezoelectric thin-film element is collected into a wiring substrate 4 which is a flat cable, and the thus-collected electrical wires are led to the outside of the base 3.

The base 3 is of a rigid body such as metal, as well as being capable of collecting ink droplets. Simultaneously, the base 3 serves as a mount of the pressurizing chamber substrate 1.

Figure 2:
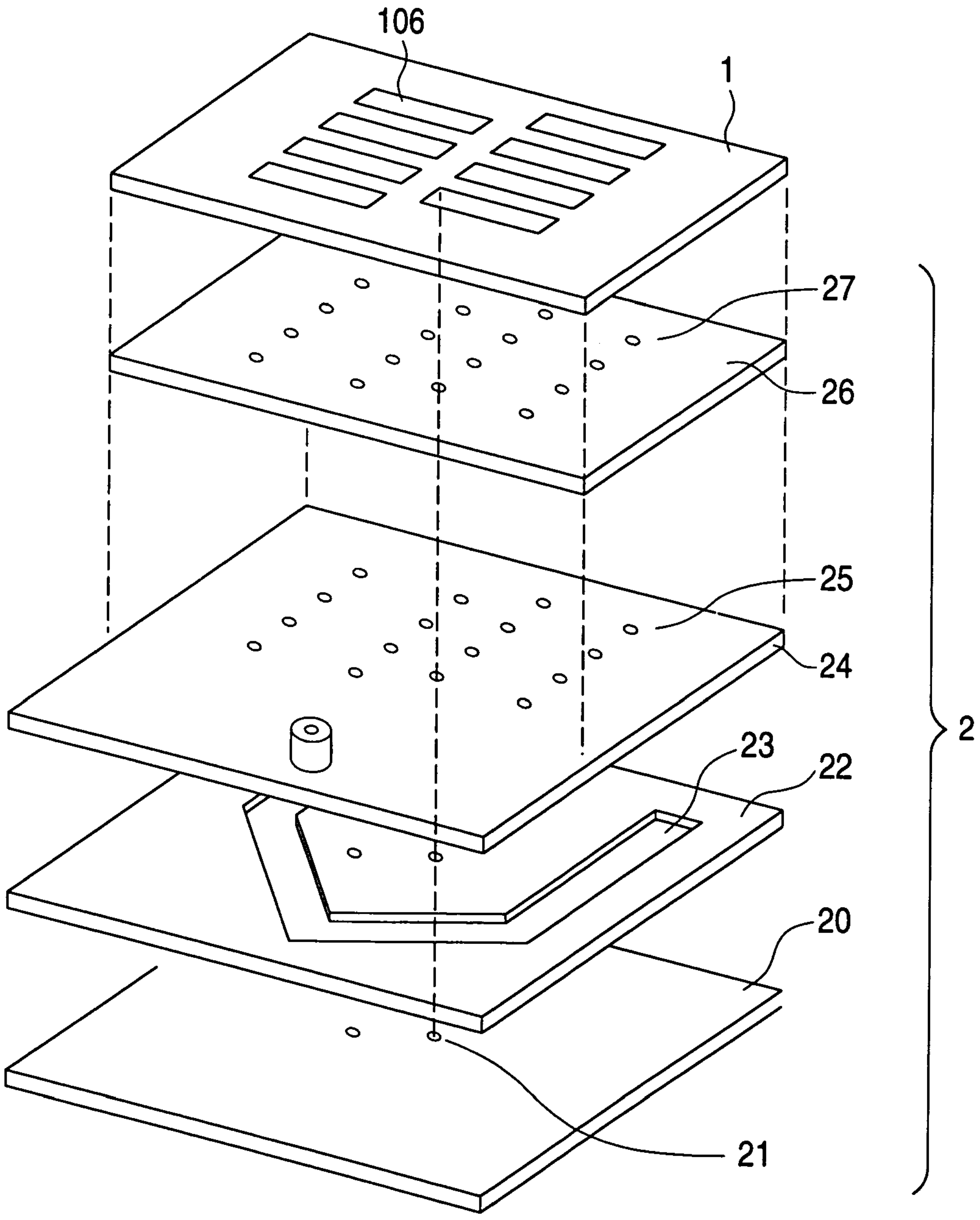
FIG. 2 is an exploded perspective view of the principle elements of the ink-jet printing head of the first aspect.

FIG. 2 shows the principle elements of the ink-jet printing head of the present aspect. In short, the layered structure of the pressurizing chamber substrate and the nozzle unit is shown in the drawing. The type of ink-jet head printer having the common ink flow path formed not in the pressurizing chamber substrate but in a reservoir chamber formation substrate is shown herein.

The structure of the pressuring chamber substrate 1 will be described later. The nozzle unit 2 comprises a communication substrate 26 having communicating paths 27 formed therein, an ink feed path formation substrate 24 having a plurality of ink supplying holes 25 formed therein, a reservoir chamber formation substrate 22 having an ink reservoir chamber 23 formed therein, and a nozzle formation substrate 20 having a plurality of nozzles 21 are formed therein. The pressurizing chamber substrate 1 and the nozzle unit 2 are bonded together by an adhesive. The previously-described ink reservoir acts in the same manner as does the common flow path shown in FIG. 1.

For brevity, FIG. 2 shows the nozzles arrayed into two rows, each row comprising four nozzles. In practice, the number of nozzles, and the number of rows are not limited, and hence any conceivable combinations are feasible.

Figure 3:
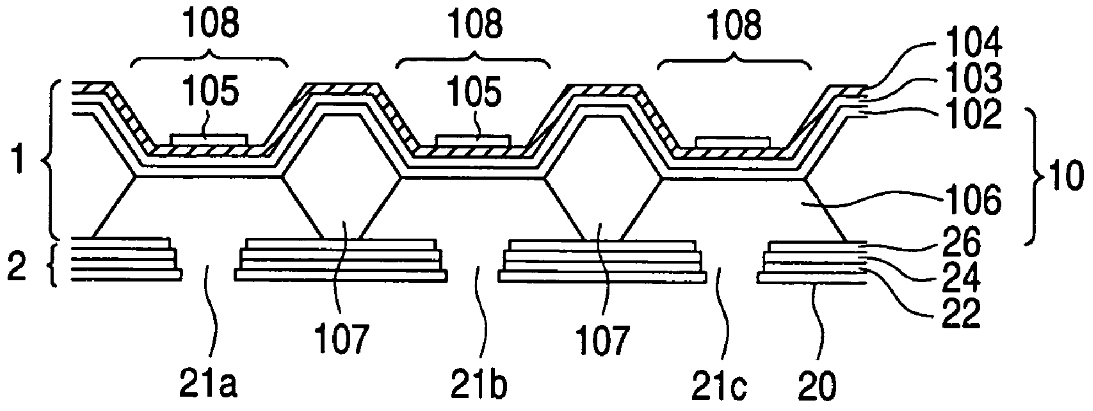
FIG. 3 is a cross-sectional view of the principle element taken across the plane perpendicular to the longitudinal direction of the pressurizing chamber of a first embodiment of the first aspect.

FIG. 3 is a cross-sectional view of the principle elements of the ink-jet printing head of the present aspect. The drawing shows the cross section of the principle elements taken along the plane perpendicular to the longitudinal direction of the pressurizing chamber. The same structural elements as those shown in FIGS. 1 and 2 are assigned the same reference numerals, and hence their explanations will be omitted. The pressurizing chamber substrate 1 is a silicon monocrystalline substrate 10 of <100> orientation in its initial stage before an etching operation. Channels 108 are formed in one side of the silicon monocrystalline substrate 10 (this side will hereinafter be referred to as an "active element side"). The channels 108 are formed such that the side walls of its side walls form an obtuse angle with respect to the bottom of the channel. An oscillating plate film 102, and a thin-film piezoelectric element which comprises a lower electrode 103, a piezoelectric film 104, and an upper electrode 105 are integrally formed in the channel 108. Pressurizing chambers 106 are formed in the other side of the silicon monocrystalline substrate 10 (this side will hereinafter be referred to as a "pressurizing chamber side") so as to be opposite to the channels 108 formed in the active element side, respectively. The pressurizing chambers 106 are formed such that the wall surfaces of a side wall 107 which separates the pressurizing chambers 106 from each other, forms an obtuse angle with respect to the bottom of the pressurizing chamber. So long as the nozzle unit 2 described with reference to FIG. 2 is bonded to the pressurizing chamber substrate 1, the principle element of the ink-jet printing head is formed.

The present aspect is based on the case that a high-density ink-jet printing head would have a density of 180 dpi, and that the pressurizing chambers 106 are arrayed at a pitch of 140 μm or thereabout. In the case where the ink-jet printing head having the pressurizing chambers formed in such high density is manufactured, it is necessary to integrally form piezoelectric elements on the silicon monocrystalline substrate 10 by use of a thin-film process, as described in the present aspect, instead of bonding a bulk piezoelectric element to the silicon monocrystalline substrate as a piezoelectric element.

When the ink-jet printing head of the present aspect is in use, the pressurizing chambers 106 covered with the nozzle unit 2 as a lid are filled with ink. Ink is squirted by applying a voltage to a piezoelectric thin-film element positioned at the nozzle that is desired to squirt ink. As a result, the oscillating plate film is deflected toward the pressurizing chamber, whereby ink is squirted.

In the present aspect, because the channels 108 are formed in the silicon monocrystalline substrate 10, the depth of the pressurizing chambers 106 are considerably shallower than the thickness of the silicon monocrystalline substrate 10 (e.g., by 75 μm). Consequently, high rigidity of the side walls of the pressurizing chamber 106 is ensured. For instance, if ink is squirted from the center nozzle 21*b* by actuating the center thin-film piezoelectric element shown in FIG. 3, the nozzles 21*a* and 21*c* on both sides of the nozzle 21*b* will not squirt ink. In other words, so-called crosstalk phenomenon does not occur.

Next, the details of embodiments of the manufacturing method for the previously described pressure generation substrate will be described.

First Embodiment

FIGS. 4A to 4E are cross-sectional views showing the steps of manufacturing the pressurizing chamber substrate of the first embodiment. For brevity, the drawing shows only one pressurizing chamber of one of the plurality of pressurizing chamber substrates 1 formed in the silicon monocrystalline substrate 10 (wafer).

Figure 4A:
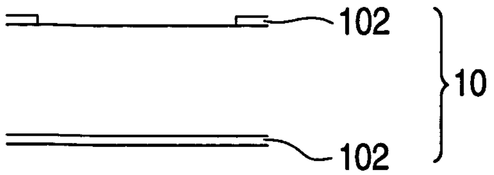
FIGS. 4A to 4E are cross-sectional views of manufacturing steps taken across the plane perpendicular to the longitudinal direction of the pressuring chamber of the first embodiment of the first aspect.

FIG. 4A: To begin with, the silicon monocrystalline substrate 10 of (100) orientation is prepared. In this drawing, assume that the direction perpendicular to the plane of the drawing sheet is a <110> axis, and that upper and lower surfaces of the silicon monocrystalline substrate 10 are (100) planes. Further, assume that the silicon monocrystalline substrate 10 has a thickness of about 150 μm. This silicon monocrystalline substrate 10 is subjected to wet thermal oxidation in oxygen atmosphere including water vapor in the temperature range between, e.g., about 1000 and 1200 degrees of centigrade. As a result, a thermal oxide film 102 is formed on both sides of the silicon monocrystalline substrate 10. The thickness of the thermal oxide film 102 is set to a thickness required when serving as an etching mask at the time of etching of the silicon monocrystalline substrate 10, which will be described later; e.g., 0.5 μm. A pattern is formed on the thermal oxide film 102 covering the active element side on which the oscillating plate film is to be formed by etching in a photolithography process which is used in an ordinary thin-film process. The width of the pattern is set to; e.g., 80 μm. A water solution of the mixture comprising hydrofluoric acid and ammonium fluoride is used as an etchant for the thermal oxide film 102.

Figure 4B:
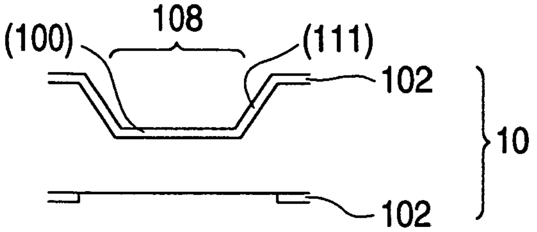

FIG. 4B: The silicon monocrystalline substrate 10 is immersed in a 10% water solution of potassium hydroxide at a temperature of 80 degrees of centigrade, whereby it is half etched. An etching selection rate of silicon to a thermal oxide film is more than 400:1 with respect to the water solution of potassium hydroxide. Therefore, only the area having an exposed silicon substrate is etched. The resultantly etched area has a trapezoidal profile which has side surfaces of (111) orientation and a bottom of (100) orientation. The side surfaces form obtuse angles (ranging from 180-about 54 degrees) with respect to the bottom. This is attributable to the fact that an etch rate depends on the crystal orientation of the silicon in the case of an etching operation which uses a water solution of potassium hydroxide, and that an etch rate in the direction of a (111) orientation is considerably slower than those in other crystal planes. The depth of etching is controlled by an etching time. For example, the depth of etching is set to 75 μm at the center of the silicon monocrystalline substrate.

The thermal oxide film 102 of the etching mask and the thermal oxide film 102 of the reverse side of the silicon monocrystalline substrate are completely etched away by the previously described hydrofluoric-acid-based mixed solution.

The thermal oxide film 102 is formed again on both sides of the silicon monocrystalline substrate 10 to a thickness of 1 μm by wet thermal oxidation. The thermal oxide film 102 formed in the trapezoidal portion acts as an oscillating plate film.

A pattern is formed in the thermal oxide film 102 on the pressurizing chamber side of the silicon monocrystalline substrate in order to form the pressurizing chambers later, by etching in the ordinary photolithography step.

Figure 4C:
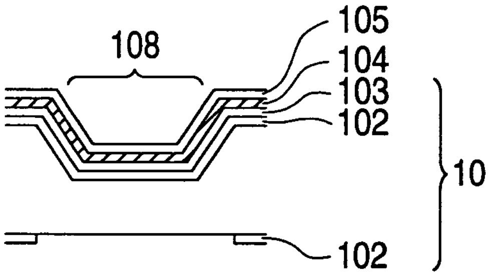

FIG. 4C: A thin-film piezoelectric element is formed on the thermal oxide film 102. The thin-film piezoelectric element comprises a piezoelectric film sandwiched between upper and lower electrodes. The lower electrode 103 is formed from; e.g., platinum having a film thickness of 0.8 μm by sputtering. The piezoelectric film 104 is composed of material that includes, as a major constituent, any one of lead zirconate titanate, lead niobate magnesium, lead niobate nickel, lead niobate zinc, and lead tungstate magnesium; or material that includes as a major constituent a solid solution of any one of the above-described substances. A film of the piezoelectric element is formed by use of; e.g., a target made by sintering an object material composition together with high frequency magnetron sputtering. If the substrate is not heated during the formation of film, a film resulting from the sputtering is an amorphous film without a piezoelectric effect. This film will be herein referred to as a piezoelectric film precursor. Subsequently, the substrate having the piezoelectric film precursor formed thereon is heated in an atmosphere including oxygen, whereby the precursor is crystallized and, then, converted into the piezoelectric film 104.

The upper electrode 105 is formed from; e.g., platinum having a film thickness of 0.1 μm, by sputtering.

Figure 4D:
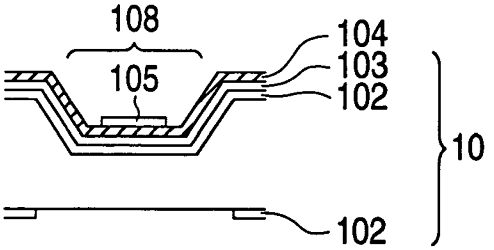

FIG. 4D: The thin-film piezoelectric element is separated into individual units. The width of the upper electrode is made narrower than the width of the pressurizing chamber so that the oscillating plate film can bring about displacements. Specifically, the upper electrode 105 is patterned such that a photo-resist is left in the area where the photoresist is desired to exist in the ordinary photolithography step. Then, the photo-resist is removed from the undesired area of the upper electrode by ion milling or dry etching.

Figure 4E:
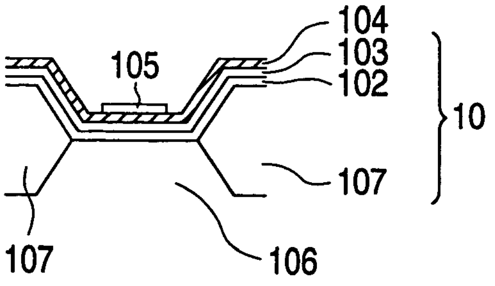

FIG. 4E: Finally, as in the previously-described etching method for the silicon substrate, the exposed pressurizing chamber side of the silicon monocrystalline substrate 10 is etched by a water solution of potassium hydroxide, whereby the pressurizing chambers 106 are formed. The silicon monocrystalline substrate 10 is etched to such a depth as to uncover the thermal oxide film 102.

The surface having the active elements formed thereon is immersed in the water solution of potassium hydroxide, and hence it is necessary to prevent the water solution of potassium hydroxide entering the active element side using jigs.

The formation of the pressurizing chamber substrate 1 of the ink-jet printing head is now completed as a result of the previously-described procedures.

The aforementioned manufacturing method has been described by applying the high frequency magnetron sputtering method to the manufacture of the piezoelectric film. However, another thin-film formation method, such as the sol-gel method, the organo-metallic thermal decomposition method, or the metal organic vapor phase epitaxy method, may be used.

Second to Sixth Embodiments

A list of other embodiments which are different from the first embodiment in structure is presented in Table 1 together with the first embodiment.

TABLE 1

Figure 5:
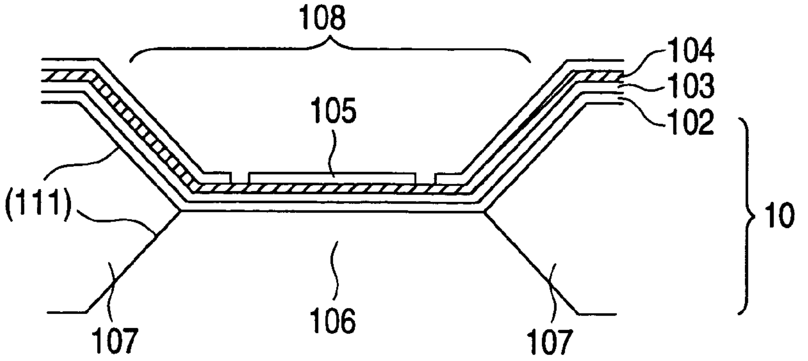
FIG. 5 is a cross-sectional view of a pressurizing chamber substrate taken across the plane perpendicular to the longitudinal direction of a pressurizing chamber of a second embodiment of the first aspect.
Figure 6:
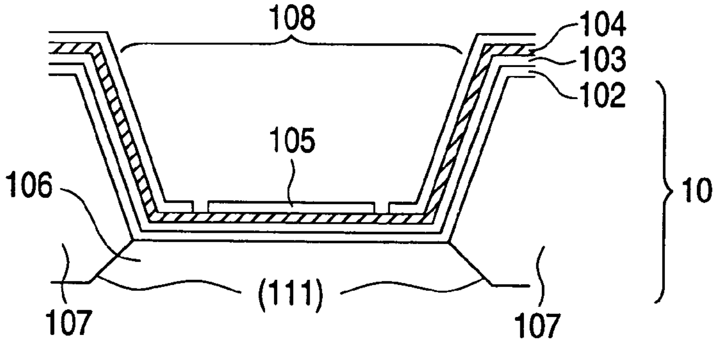
FIG. 6 is a cross-sectional view of a pressurizing chamber substrate taken across the plane perpendicular to the longitudinal direction of a pressurizing chamber of a third embodiment of the first aspect.
Figure 7:
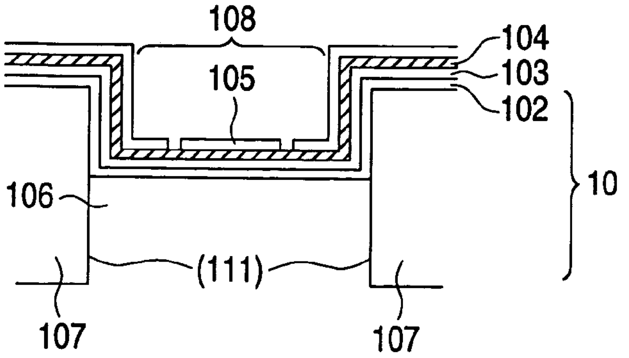
FIG. 7 is a cross-sectional view of a pressurizing chamber substrate taken across the plane perpendicular to the longitudinal direction of a pressurizing chamber of a fourth embodiment of the first aspect.
Figure 8:
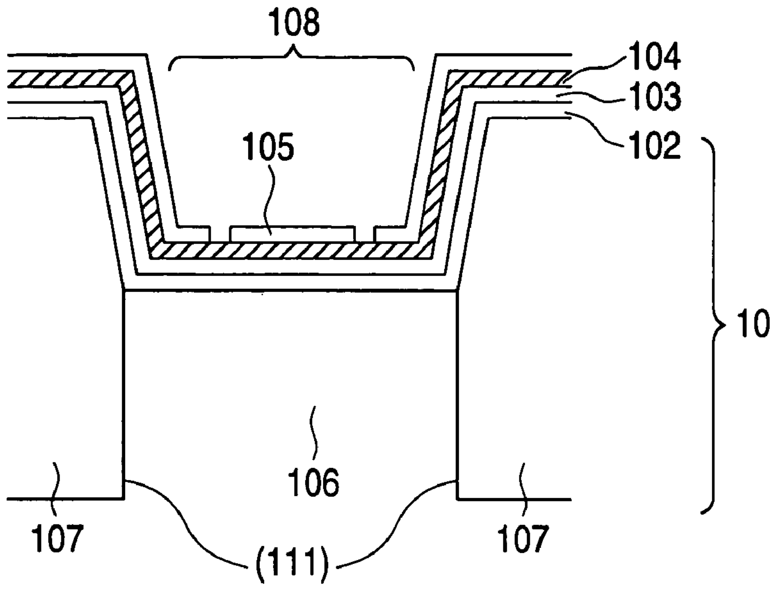
FIG. 8 is a cross-sectional view of a pressurizing chamber substrate taken across the plane perpendicular to the longitudinal direction of a pressurizing chamber of a fifth embodiment of the first aspect.
Figure 9:
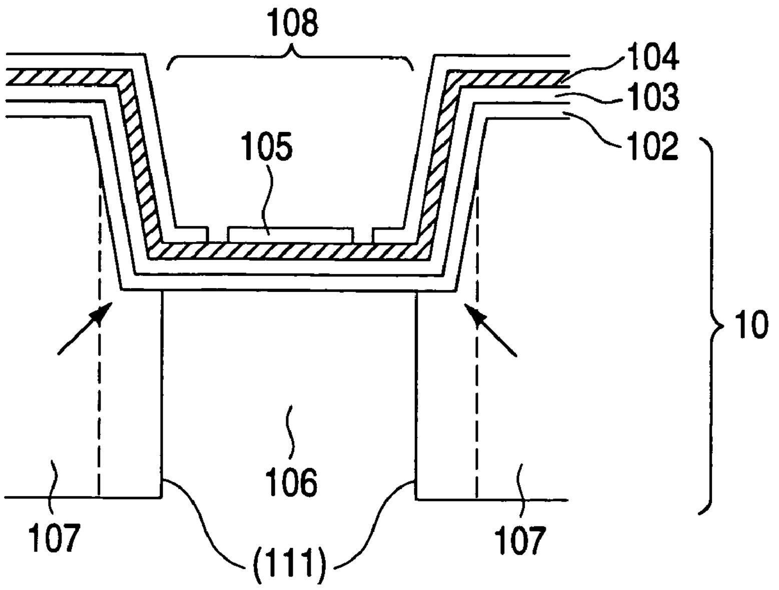
FIG. 9 is a cross-sectional view of a pressurizing chamber substrate taken across the plane perpendicular to the longitudinal direction of a pressurizing chamber of a sixth embodiment of the first aspect.

| | No. of Fig. | Orientation | Upper Electrode Patterning | Channels in Active Element Side | Pressure Chamber Width and Active Element Side Width |
|---|---|---|---|---|---|
| 1 | FIG. 3 | (100) | Photolithography And Etching Steps | Anisotropic Wet Etching | Equal |
| 2 | FIG. 5 | (100) | Laser Processing | Anisotropic Wet Etching | Equal |
| 3 | FIG. 6 | (100) | Laser Processing | Dry Etching | Equal |
| 4 | FIG. 7 | (110) | Laser Processing | Anisotropic Wet Etching | Equal |
| 5 | FIG. 8 | (110) | Laser Processing | Dry Etching | Equal |
| 6 | FIG. 9 | (110) | Laser Processing | Dry Etching | Pressure Chamber > Active Element |

FIGS. 5 through 9 are cross-sectional views of pressurizing chamber substrates of the second through sixth embodiments which are taken along the plane perpendicular to the longitudinal direction of the pressurizing chamber. For brevity, as in FIGS. 5 to 9, only one of the pressurizing chambers is shown in these drawings.

FIG. 5 shows a cross section of the pressurizing chamber substrate of the second embodiment. The difference between the second embodiment and the first embodiment is the pattern of the upper electrode 105. After having been formed, the upper electrode 105 is patterned for the purpose of isolating elements by direct exposure to a laser beam. Therefore, the upper electrode film 105 still remains on the top of the side wall 107. However, this upper electrode film 105 is electrically separated from the upper electrode 105 laid on the top of the pressurizing chamber 106, and hence that upper electrode film does not act as an upper electrode. In the above-described patterning operation, a YAG laser, for example, is used.

FIG. 6 shows a cross section of the pressurizing chamber substrate of the third embodiment. The third embodiment is different from the second embodiment in that the side walls of the channel formed in the active element side have a steep angle. In the present embodiment, the channels 108 are formed deeper in the active element side compared to those formed in the pressurizing chamber side. The channels are formed into such a shape in order to equalize the width of the side wall 107 by use of the dry etching method. If the depth of the pressurizing chamber 106 is made shallow, and if the width of the pressurizing chamber 106 on the active element side is set so as to be identical with the width of the pressurizing chamber 106 of the second embodiment, the width of an opening of the pressurizing chamber at the bottom of the drawing can be reduced. As a result, the density of the pressurizing chambers can be further increased.

FIG. 7 shows a cross section of the pressurizing chamber substrate of the fourth embodiment. The fourth embodiment is an example of a silicon monocrystalline substrate which has a (100) orientation and takes the direction perpendicular to the longitudinal direction of the pressurizing chamber 106, or the direction perpendicular to the plane of the drawing sheet, as a <1, −1, 2> axis.

If the pressurizing chamber 106 is anisotropically etched using a water solution of potassium hydroxide, a rectangular pressurizing chamber 106 which has two (111) planes substantially perpendicular to the silicon monocrystalline substrate 10 can be formed. As previously described, this is attributable to the fact that an etch rate depends on the crystal orientation of the silicon in the case of an etching operation which uses the water solution of potassium hydroxide, and that an etch rate in the direction of a (111) orientation is considerably slower than those in other crystal planes. As a result, the density of the pressurizing chambers can be increased to a much greater extent when compared with the density obtained as a result of use of the silicon substrate of (100) orientation. The channels on the active element side are also formed by wet anisotropic etching, and hence the upper electrode 105 is patterned by laser.

FIG. 8 shows a cross section of the pressurizing chamber substrate of the fifth embodiment. The fifth embodiment is different from the fourth embodiment in that the wall surfaces of the channel 108 formed on the active element side form a gentle angle with respect to the bottom.

The channels 108 are formed in the active element side by dry etching. In the present embodiment, in the case where the lower electrode 103, the piezoelectric film 104, and the upper electrode 105 are formed by sputtering, step coverage of the film material, which results from formation of a film by sputtering, toward the inside of the channel 108 on the active element side is improved. As a result, the flatness of the film formed on the bottom of the channel is further improved.

FIG. 9 shows a cross section of the pressurizing chamber of the sixth embodiment. The sixth embodiment is different from the fifth embodiment in that the width of the pressurizing chamber is narrower than the width of the channel formed on the active element side.

If the width of the pressurizing chamber becomes wider than the width of the channel formed on the active element side (designated by a dot line in the drawing), the strength of the pressurizing chamber becomes weak in the vicinity of its angular portions (designated by the arrow in the drawing) when the thin-film piezoelectric element is actuated for squirting ink. As a result, the film will fracture. In the present embodiment, the width of the pressurizing chamber 106 is made slightly narrower than the width of the channel 108 on the active element side in consideration of an allowance in order to prevent the fracture of the film.

Although the above embodiments have been described with use of a thermal oxide silicon film as an oscillating plate film, the oscillating plate film is not limited to that film. The oscillating plate film may be made from; e.g., a zirconium oxide film, a tantalum oxide film, a silicon nitride film, or an aluminum oxide film. It is also possible to cause the lower electrode film to double as the oscillating plate film by obviating the oscillating plate film itself.

Although the foregoing embodiments have been described with use of the water solution of potassium hydroxide as a water solution for use in anisotropically etching the silicon substrate, it goes without saying that another alkaline-based solution, such as sodium hydroxide, hydrazine, or tetramethyl-ammonium-hydroxide, may be used.

<Second Aspect>

The second aspect of practice of the present invention relates to a method of manufacturing an ink-jet printing head that permits formation of a plurality of pressurizing chamber substrates which do not cause crosstalk, even in the case of a substrate having a large area, by forming a recess in the surface of a silicon monocrystalline substrate where pressurizing chambers are to be formed.

(Structure of a Wafer)

Figure 10:
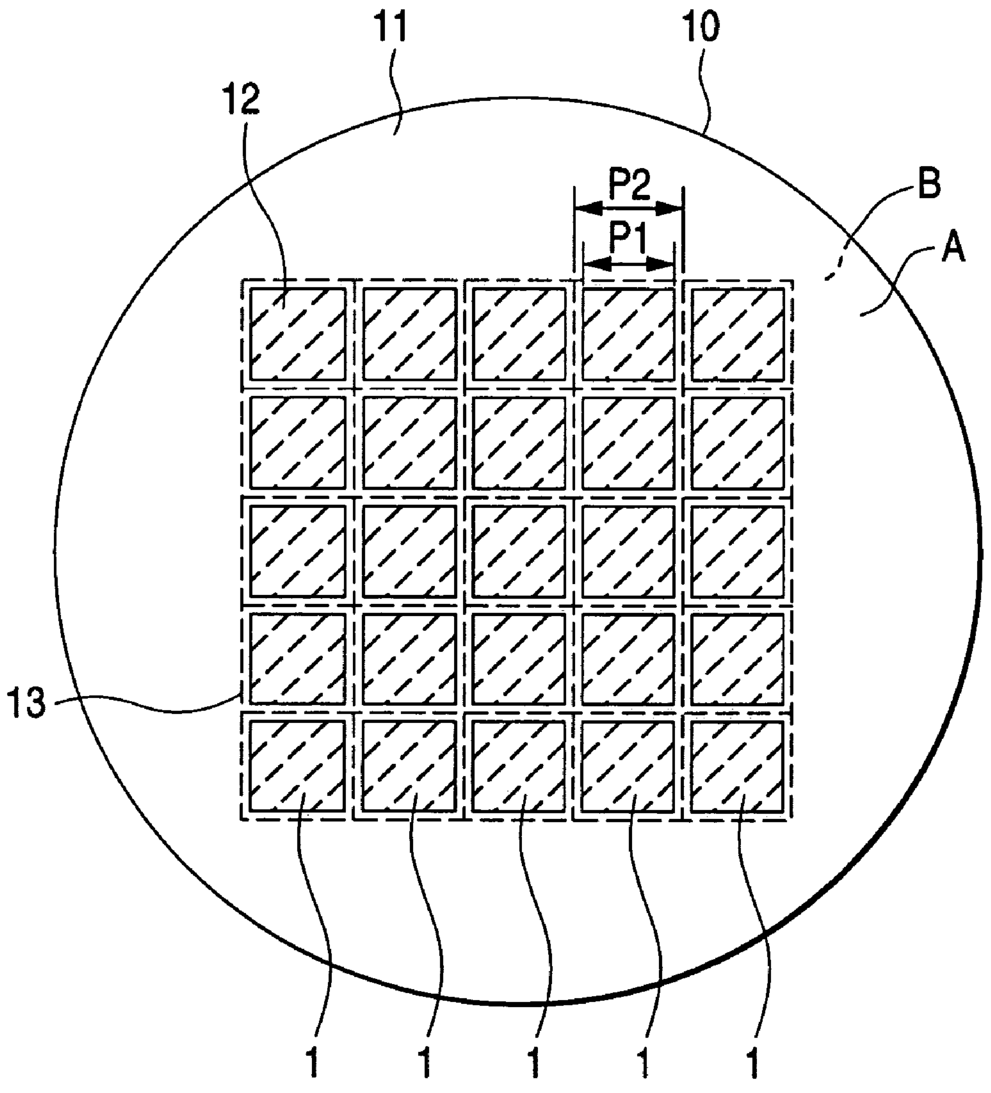
FIG. 10 is a layout of a silicon monocrystalline substrate of an ink-jet printing head of a second aspect of practice of the present invention.

FIG. 10 is a layout of pressurizing chamber substrates on a silicon monocrystalline substrate (i.e., a wafer) according to the second aspect of the present invention. As shown in the drawing, a plurality of pressurizing chamber substrates 1 collectively formed on the silicon monocrystalline substrate 10. Although the silicon monocrystalline substrate 10 may be made of monocrystalline silicon as is the conventional substrate, the area of the silicon monocrystalline substrate is larger than that of a conventional wafer. Since the area of the silicon monocrystalline substrate is made large, the thickness of the substrate is also made larger than that of the conventional substrate in order to ensure the mechanical strength of the silicon monocrystalline substrate during the course of the manufacturing steps. For example, the conventional substrate has a thickness of less than 150 μm in order to prevent crosstalk, whereas the silicon monocrystalline substrate 10 of the present aspect has a thickness of about 300 μm.

The area of the substrate can be made large so long as no problems arise in handling the silicon monocrystalline substrate during the course of the manufacturing steps. For instance, the area of the conventional substrate is limited to a diameter of about 4 inches. However, in the case of the substrate of the present aspect of the invention, the area of the substrate can be increased to the diameter ranging from 6 to 8 inches. A larger number of pressurizing chamber substrates 1 can be formed on one silicon monocrystalline substrate as the area of the silicon monocrystalline substrate increases, which in turn results in further cost cutting.

The area on the substrate 10 where one pressurizing chamber substrate 1 is formed will be referred to as a unit area. The substrate 10 is segmented into a matrix pattern by substrate unit borders 13. The unit areas (i.e., the pressurizing chamber substrates) are arrayed in rows and columns. In order to facilitate the handling of the substrate during the course of the manufacturing steps, the pressurizing chamber substrate 1 is not arrayed in an outer peripheral area 11 of the substrate 10. A recess 12 is formed within each unit area on the pressurizing chamber side of the monocrystalline silicon substrate 10. A recess is not formed in the border between the pressurizing chamber substrates 1; namely, in the peripheral area of the unit area. For this reason, the substrate unit border 13 having a large film thickness remains in a matrix pattern after the etching operation. The strength of the substrate 10 itself is ensured after the recesses 12 have been formed during the course of manufacture of the pressurizing chamber substrate 1. As a result of the formation of the recesses 12, the thickness of the substrate in the position of the recess 12 becomes 150 μm that is the same as the thickness of the conventional substrate. However, the thickness of the substrate in the position of the substrate unit border 13 is larger than that of the conventional substrate. Therefore, the high strength of the substrate is maintained.

When the silicon monocrystalline substrate 10 is sliced into individual pressurizing chamber substrates 1 after the formation of the pressurizing chamber substrates 1, it is only necessary to slice it along the substrate unit border 13. In the thus-separated pressurizing chamber substrate 1, a thick peripheral area still remains along the circumference of the recess, and therefore the rigidity of the pressurizing chamber substrate 1 itself can be maintained. Even when the pressurizing chamber substrate 1 is mounted on the base 3 of the ink-jet print head, the contact area between the side wall of the pressurizing chamber substrate 1 and the internal wall of the base 3 is large, and therefore the pressurizing chamber substrate 1 can be stably mounted on the base 3.

Figure 11:
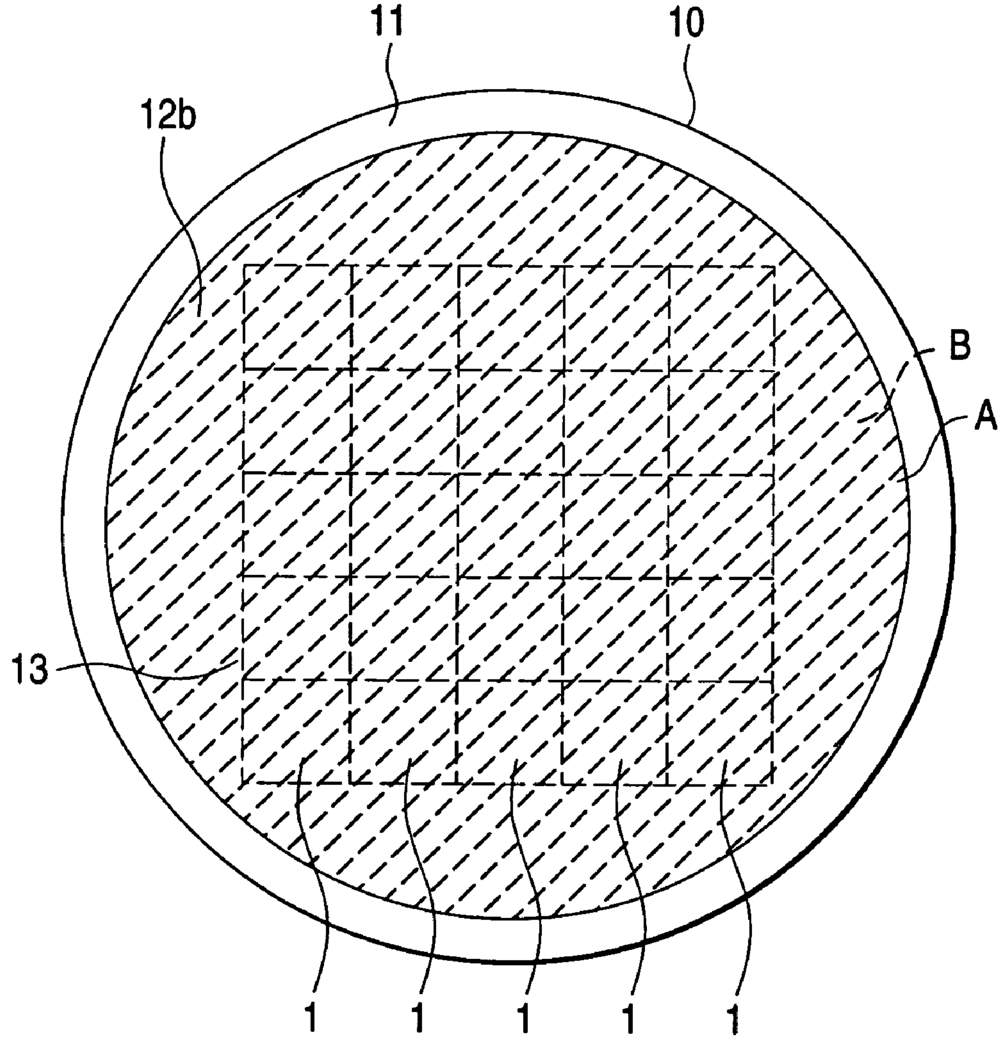
FIG. 11 is a modification of the layout of the silicon monocrystalline substrate of the ink-jet printing head of the second aspect.

In stead of forming a recess in each unit area in the manner as previously described, a recess 12*b* may be formed in the entire substrate 10 so as to leave the outer peripheral area 11, as shown in FIG. 11. The outer peripheral area 11 remains, which allows the mechanical strength of the substrate 10 itself to be ensured.

First Embodiment of Manufacturing Method

Next, an embodiment of the method of manufacturing the ink-jet printing head of the present aspect will be described.

FIGS. 12A to 12E and FIGS. 13F to 13J show the cross section of the pressurizing chamber substrate of the present aspect during the course of the manufacturing steps. For brevity, the cross section of one of the pressurizing chamber substrates 1 formed on the silicon monocrystalline substrate 10 (a wafer) is schematically shown.

Figure 12A:
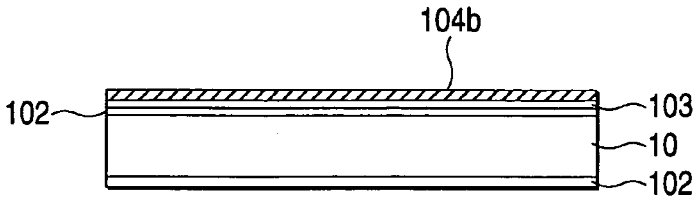
FIGS. 12A to 12E are cross-sectional views of manufacturing steps taken across the plane perpendicular to the longitudinal direction of the pressurizing chamber of the first embodiment of the second aspect.

FIG. 12A: To being with, an etching protective layer 102 (a thermal oxide layer) comprising silicon dioxide is formed over the entire silicon monocrystalline substrate 10 having a (110) plane and predetermined thickness and size (e.g., a diameter of 100 mm and a thickness of 220 μm) by thermal oxidation.

The formation of the piezoelectric thin film can be considered to be the same as that in the first embodiment. In short, platinum which serves as the lower electrode 103 is formed on the surface of the etching protective layer 102 on one side (i.e., the active element side) of the silicon monocrystalline substrate 10 to a thickness of; e.g., 800 nm, by the thin-film formation method such as the sputtering film formation method. In this event, ultrathin titan or chrome may be interposed as an intermediate layer in order to increase an adhesion strength between the upper layer and the platinum layer and between the lower layer and the same. The lower electrode 103 doubles as the oscillating plate film.

A piezoelectric film precursor 104*b* is stacked on the lower electrode. In the present embodiment, the piezoelectric film precursor is formed from a PZT piezoelectric film precursor which has a mol ratio of lead titanate and lead zirconate 55%:45%, by the sol-gel method. The precursor is repeatedly subjected to coating/drying/degreasing operations six times until it finally has a thickness of 0.9 μm. As a result of various trial tests, the practical piezoelectric effect can be obtained so long as A and C of the chemical formula of the piezoelectric film expressed by $Pb_cTi_AZr_BO_3$[A+B=1] are selected within the range of $0.5 \leqq A \leqq 0.6$ and $0.85 \leqq C \leqq 1.10$. The film formation method is not limited to the above-described method. High frequency sputtering film formation method or CVD may be also used as the film formation method.

Figure 12B:
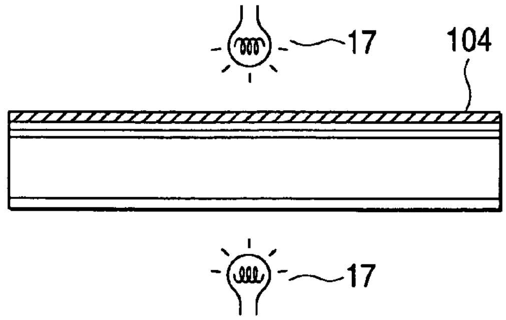

FIG. 12B: The overall substrate is heated to crystallize the piezoelectric film precursor. In the present embodiment, both sides of the substrate are exposed to an infrared ray radiation light source 17 in an oxygen atmosphere at a temperature of 650 degrees of centigrade for three minutes. Thereafter, the substrate is heated at a temperature of 900 degrees of centigrade for one minute and, then, naturally cooled, whereby the piezoelectric film is crystallized. Through these steps, the piezoelectric film precursor 24 is crystallized and sintered while maintaining the foregoing composition, so that the piezoelectric film 104 is formed.

Figure 12C:
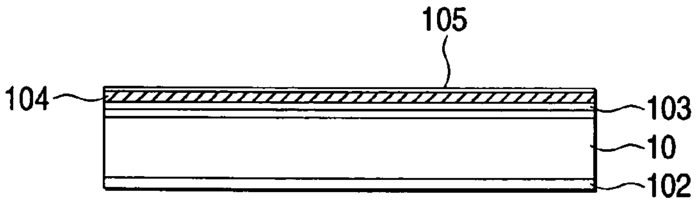

FIG. 12C: The upper electrode 105 is formed on the piezoelectric film 104. In the present embodiment, the upper electrode 105 is formed from gold having a thickness of 200 nm by the sputtering film formation method.

Figure 12D:
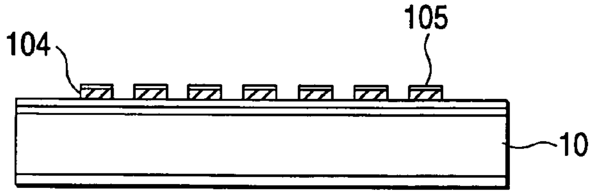

FIG. 12D: Appropriate etching masks (not shown) are formed the positions of the upper electrode 105 on the piezoelectric film 104 where the pressurizing chambers 106 are to be formed. Then, the masked areas are formed into a predetermined shape by ion milling.

Figure 12E:
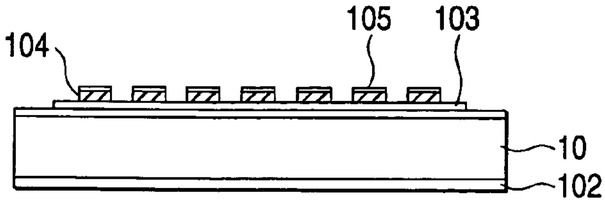

FIG. 12E: Appropriate etching masks (not shown) are formed on the lower electrode 103. Then, the masked areas are formed into a predetermined shape by ion milling.

Figure 13F:
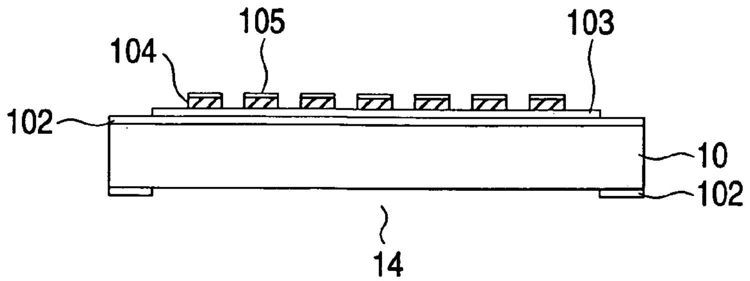
FIGS. 13F to 13J are cross-sectional views of manufacturing steps of taken across the plane perpendicular to the longitudinal direction of the pressurizing chamber of the first embodiment of the second aspect.

FIG. 13F: A protective film (not shown to prevent a complication) to various chemicals in which the substrate will be immersed in later steps, is formed over the active element side of the substrate 10. The etching protective layer 102 on the pressurizing chamber side of the substrate 10 is etched away from at least the area where the pressurizing chambers and the side walls are to be formed, by means of hydrogen fluoride. As a result, a window 14 for etching purposes is formed.

Figure 13G:
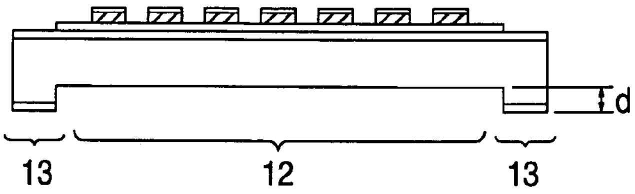

FIG. 13G: The silicon monocrystalline substrate 10 in the area of the window 14 is anisotropically etched to a predetermined depth "d" by use of anisotropic etchant; e.g., a water solution of potassium hydroxide having a concentration of about 40% as well as having its temperature maintained at a temperature of 80 degrees of centigrade. The predetermined depth "d" corresponds to a depth obtained by subtracting a design value of the height of the side wall 107 from the thickness of the substrate 10. In the present embodiment, a depth "d" is set to 110 μm which is half the thickness of the substrate 10, that is, 220 μm. Therefore, the height of the side wall 107 becomes 110 μm. The anisotropic etching method that uses active gas; e.g., the parallel plate reactive ion etching method which uses active gas, may also be used in forming the pressurizing chambers. Through this step, the recesses 12 having a reduced substrate thickness and the substrate unit border 13 (i.e., a raised area), as described with reference to FIG. 10.

Figure 13H:
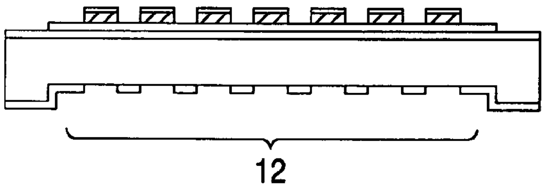

FIG. 13H: A silicon dioxide film is formed on the pressurizing chamber side of the substrate 10 having the recesses 12 formed thereon to a thickness of 1 μm as an etching protective layer by means of a chemical vapor deposition such as CVD. Then, a mask for use in forming the pressurizing chambers is formed, and the silicon dioxide is then etched using a water solution of hydrogen fluoride. The silicon dioxide film may be formed by use of the sol-gel method instead of the above-described chemical vapor phase epitaxy. However, the piezoelectric film has already been formed on the active element side of the substrate, and hence thermal oxidation which requires heat treatment at a temperature of more than 1000 degrees of centigrade is not suitable because the crystal properties of the piezoelectric film are obstructed by the heat.

Figure 13I:
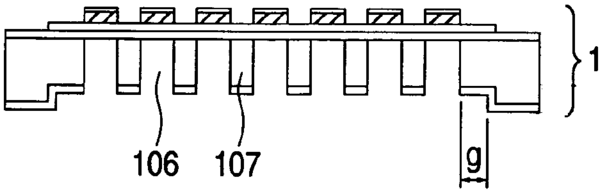

FIG. 13I: The substrate 10 is further anisotropically etched from its pressurizing chamber side to active element side by use of anisotropic etchant; e.g., a water solution of potassium hydroxide having a concentration of about 17% as well as having its temperature maintained at a temperature of 80 degrees of centigrade. As a result, the pressurizing chambers 106 and the side walls 107 are formed. It is desirable for a distance "g" between the raised area and the pressurizing chamber in closest proximity to the raised area to satisfying $g \geqq d$ with respect to the depth "d". That is because a liquid resin resist often stays at an angular portion of the raised area as a result of application of the liquid resin resist when pattering the etching protective layer, and hence it is necessary to ensure a certain degree of allowance in order to prevent the thus-stayed liquid resin resist from adversely affecting the dimensional accuracy of the pressurizing chamber.

Figure 13J:
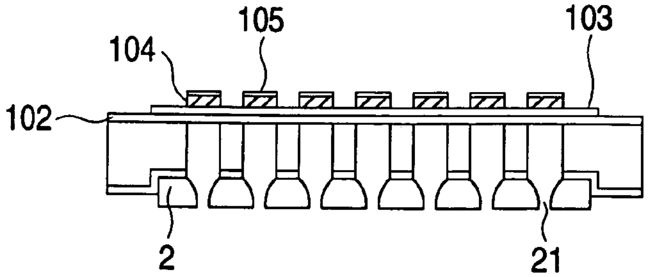

FIG. 13J: The separate nozzle unit 2 is bonded to the pressuring chamber substrate formed through the previously-described steps while being positioned by means of the side surfaces of the base unit border 13 (see FIGS. 1 and 2).

In the first embodiment, the pressurizing chambers are formed on a pitch of 70 μm, and the pressurizing chamber is set to have a width of 56 μm and a length of 1.5 mm (i.e., the depth in the drawing). Further, the width of the side wall is set to 14 μm. 128 elements are arranged in one row of the pressurizing chambers. Therefore, a printer head having two rows of pressurizing chambers, i.e., 256 nozzles, and a print density of 720 dpi is implemented.

This ink-jet printing head was compared with the conventional ink-jet printing head (i.e., an ink-jet printing head in which a side wall has the same width as that of the ink-jet printing head of the present invention, i.e., 14 μm, and a height of 220 μm.).

In the case of the conventional head, an ink squirting velocity was 2 m/sec., and the quantity of squired ink was 20 ng when one element (one pressurizing chamber) was actuated. However, the adjacent elements were simultaneously actuated, the ink squirting velocity increased to 5 m/sec., and the quantity of squirted ink increased to 30 ng. In this way, impractical performance was obtained. As previously described, this is attributable to a pressure loss resulting from deformation of the side wall of the pressurizing chamber as well as to the transmission of a pressure to the adjacent elements.

In contrast, in the case of the ink-jet printing head of the present embodiment, the ink squirting velocity was 8 m/sec., and the quantity of squirted ink was 22 ng under the same conditions as those of the convention ink-jet printing head. Further, there were no substantial differences between when a single element was actuated and when the adjacent elements were simultaneously actuated in characteristics. In other words, according to the present embodiment, the rigidity of the side wall could be increased by more than 30 times as a result of the height of the side wall being reduced to its original value; i.e., 110 μm.

Further, the substrate unit border is left in a portion of the pressurizing chamber substrate, and the wall surface of that substrate unit border is used as the reference when the nozzle plate is positioned. As a result, the nozzle unit can be bonded to the pressurizing chamber substrate with high accuracy.

Figure 14:
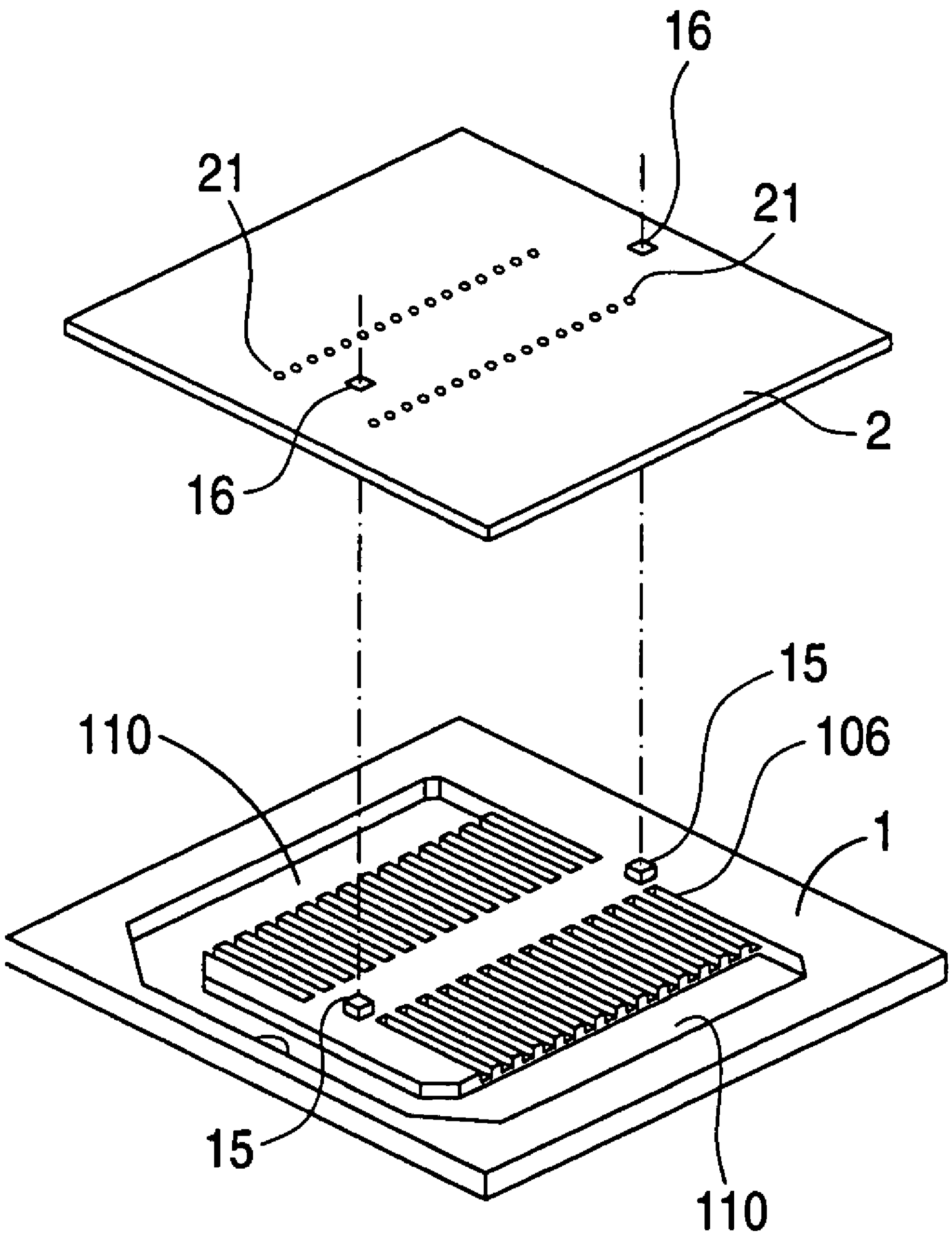
FIG. 14 is an explanatory view of bonding the pressurizing chamber substrate and the nozzle unit of the second aspect.

FIG. 14 shows another embodiment of the ink-jet printing head having stoppers and receivers for positioning the nozzle unit formed therein. Projections 15 are formed as stoppers in the area of the pressurizing chamber substrate 1 where the pressurizing chambers 106 are not formed. Positioning holes 16 are formed in the nozzle unit 2 as receivers so as to be opposite to the projections 15 when the nozzle unit 2 is bonded to the pressurizing chamber substrate 1. Like this embodiment, projections and positioning holes for positively securing the pressurizing chamber substrate to the nozzle unit can be optionally formed.

(Second Embodiment of Manufacturing Method)

FIGS. 15F to 15I show a second embodiment of the manufacturing method for the ink-jet printing head. The previously described steps of the first embodiment shown in FIGS. 12A to 12E also apply to the present embodiment.

Figure 15F:
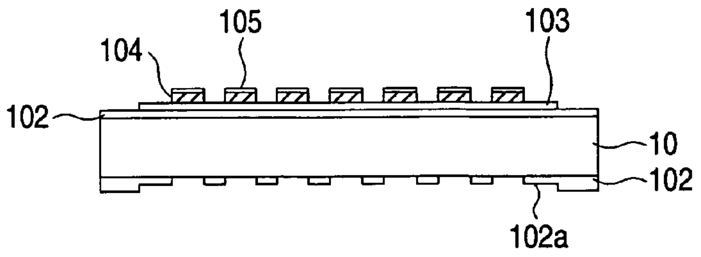
FIGS. 15F to 15I are cross-sectional views of manufacturing-steps of taken across the plan perpendicular to the longitudinal direction of the pressurizing chamber of the second embodiment of the second aspect.

FIG. 15F: A mask is formed on the pressurizing chamber side of the substrate 10 in the shape in which the pressurizing chambers 106 are to be formed. The silicon dioxide film 102 that acts as an etching protective layer is etched by hydrogen fluoride. The areas of the etching protective layer 102 that correspond to the recesses 12 of the first embodiment are etched, so that thin-film areas 102*a* are formed.

Figure 15G:
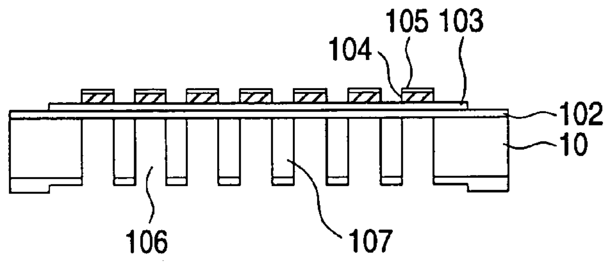

FIG. 15G: The substrate 10 is further anisotropically etched from its pressurizing chamber side to active element side by use of anisotropic etchant; e.g., a water solution of potassium hydroxide having a concentration of about 17% as well as having its temperature maintained at a temperature of 80 degrees of centigrade.

Figure 15H:
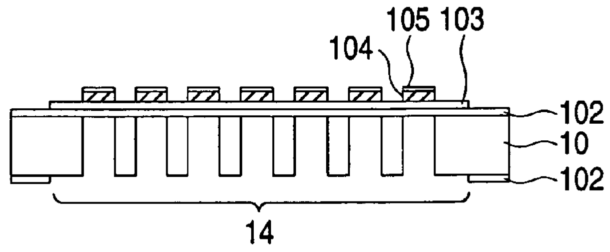

FIG. 15H: The thin-film areas 102*a* are etched away by hydrogen fluoride, whereby a window 14 having a silicon monocrystalline surface exposed is formed.

Figure 15I:
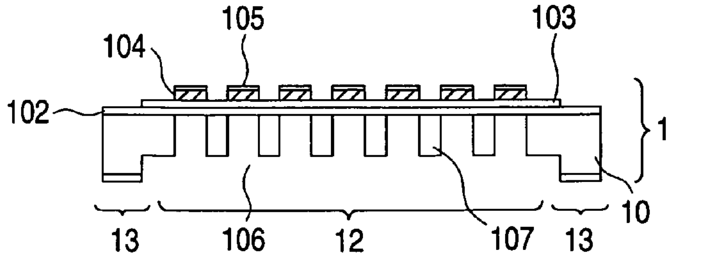

FIG. 15I: The side walls 107 are reduced to a predetermined height by use of anisotropic etchant; e.g., a water solution of potassium hydroxide having a concentration of about 40% as well as having its temperature maintained at a temperature of 80 degrees of centigrade.

According to the second embodiment, the structure of the ink-jet printing head of the present aspect can be also obtained by use of the previously-described manufacturing steps. If the thickness of the thin-film areas 102*a* is controlled, in the step shown in FIG. 15F, to such an extent as to become zero the instant the substrate is etched in the step shown in FIG. 15G, the step shown in FIG. 15H can be omitted.

The substrate 10 that has finished undergoing formation of the pressurizing chamber substrates is separated into individual pressurizing chamber substrates 1. At this time, if the pressurizing chamber substrates 1 are separated from each other on pitch P1 shown in FIG. 10, the pressurizing chamber substrate 1 which is the same as the conventional substrate can be obtained. Further, the pressurizing chamber substrates 1 may be separated from each other on pitch P2 (i.e., along the center line of the substrate unit border 13). In the latter case, a thick side wall is formed along the circumference of the thus-separated pressurizing chamber substrate 1. As shown in FIG. 1, this side wall acts as the surface to be bonded between the base 3 and the pressurizing chamber substrate 1 when the pressurizing chamber substrate is fitted into the base 3. Therefore, the pressurizing chamber substrate becomes easy to handle, and an adhesion strength of the pressurizing chamber substrate with respect to the base is increased.

As has been described above, by virtue of the second aspect of the present invention, the side wall is formed to an intended height irrespective of the original thickness of the silicon monocrystalline substrate by etching the pressurizing chamber side of the substrate so as to form a recess. As a result, the rigidity of the side wall can be increased.

Further, if the step of forming a recess is carried out immediately before the step of separating the silicon monocrystalline substrate into the individual pressurizing chamber substrates, only the minimum attention is paid to handle the pressurizing chamber substrate whose rigidity is decreased.

In addition, the stoppers can be integrally formed on the pressurizing chamber substrate with high accuracy. If these stoppers are used as the reference when the nozzle plate is positioned, the relative positional accuracy between the pressurizing chamber substrate and the nozzle can be improved.

<Third Aspect>

Contrasted with the second aspect, the third aspect of the present invention features a recess formed in the side of the silicon monocrystalline substrate opposite to the side on which the pressurizing chambers are formed.

(Structure of a Wafer)

Figure 16:
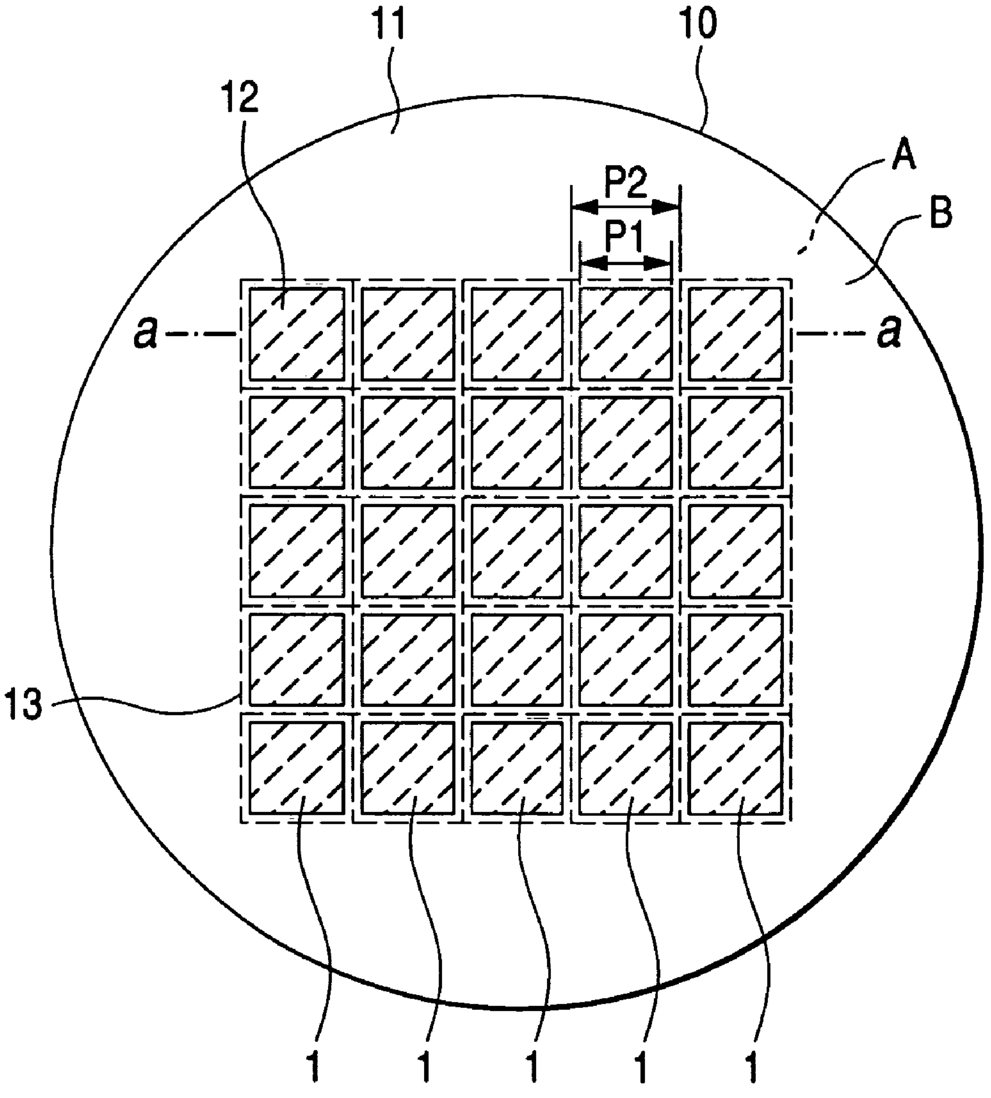
FIG. 16 is a layout of a silicon monocrystalline substrate of an ink-jet printing head of a third aspect of practice of the present invention.

FIG. 16 is a layout of a silicon monocrystalline substrate for use in a method of manufacturing pressurizing chamber substrates of the present aspect of the invention. The layout of the present aspect can be considered to be identical with that of the second aspect. In short, the area of the substrate 10 is set so as to be larger and thicker than the conventional substrate. Further, as in the second aspect, unit areas are formed. However, the recess 12 is formed in the active element side in the present aspect of the invention.

The following descriptions will be based on the assumption that the recess 12 and the unit area are rectangular when viewed from front, and that the width of the recess 12 is P1 and the pitch of the unit area (i.e., the interval between the substrate unit borders 13) is P2.

Next, the method of manufacturing the ink-jet printing head of the present aspect of the invention will be described. FIGS. 17A to 17J and FIGS. 18A to 18F schematically show a cross section of the silicon monocrystalline substrate 10 during the course of the manufacturing steps. FIGS. 17A to 19 are cross-sectional views of the silicon monocrystalline substrate 10 taken across line a—a shown in FIG. 16. More specifically, these drawings show processes of the manufacture of the substrate when observed in the direction of the cross section taken across the plurality of side walls 107. The active element side corresponds to the upper side of the substrate shown in FIGS. 17A to 19.

(Recess Formation Step)

FIGS. 17A to 17J show steps of forming a recess in the substrate.

Figure 17A:
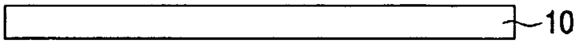
FIGS. 17A to 17J are cross-sectional views of manufacturing steps (recess formation step) of taken across the plane perpendicular to the longitudinal direction of the pressurizing chamber of the third aspect.

FIG. 17A: Wafer cleaning step: Oil or water on the substrate are removed for the purpose of preprocessing, of the substrate.

Figure 17B:
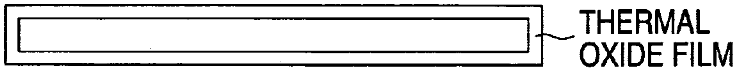

FIG. 17B: Layer-to-be-processed formation step: A silicon dioxide layer is formed on the substrate as a layer to be processed. For example, the substrate is thermally oxidized; e.g., in the flow of dry oxygen for about 22 hours in a furnace at a temperature of 1100 degrees of centigrade, whereby a thermal oxide film is formed to a thickness of about 1 μm. Alternatively, the substrate is thermally oxidized; e.g., in the flow of oxygen containing water vapor for about 5 hours in the furnace at a temperature of 1100 degrees of centigrade, whereby a thermal oxide film is formed to a thickness of about 1 μm. The thermal oxide film thus formed by either of the above methods acts as a protective layer to etching substances.

Figure 17C:
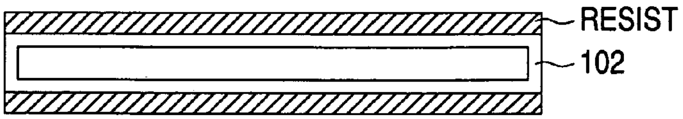

FIG. 17C: Resist coating step: The substrate is uniformly coated with a resist by spinning or spraying. In order to carry out a pre-drying operation, the thus-coated substrate is heated at the temperature between 80 and 100 degrees of centigrade, so that it is pre-dried, so that a solvent is removed from the substrate. To protect the thermal oxide film formed on the rear side of the wafer, the same resist as being formed on the front surface of the substrate is also formed on the rear side of the substrate.

Figure 17D:
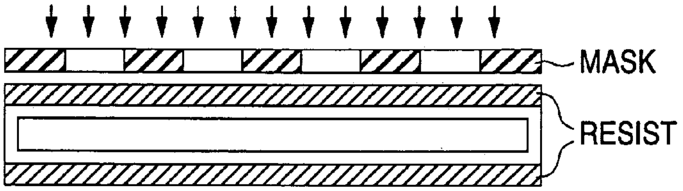

FIG. 17D: Exposure: The substrate is masked so as to leave the resist in the position of the substrate unit border, and then the thus-masked substrate is exposed to ultraviolet radiation or X rays.

Figure 17E:
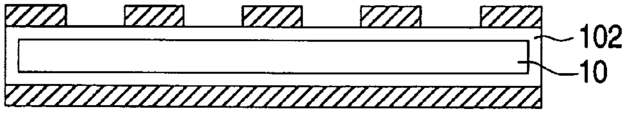

FIG. 17E: Development: The substrate that has finished undergoing exposure is developed and rinsed by spraying or dipping. A positive resist pattered on the substrate in this case, but it goes without saying that a negative resist can be patterned on the substrate. After the development, the substrate is dried at the temperature between 120 and 180 degrees of centigrade in order to set the resist.

Figure 17F:
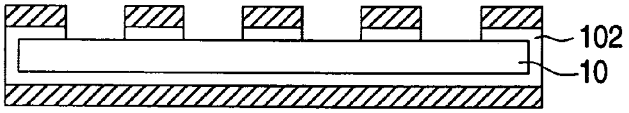

FIG. 17F: Etching step: The thermal oxide film is etched by a water solution of the mixture comprising; e.g., hydrofluoric acid and ammonium fluoride.

Figure 17G:
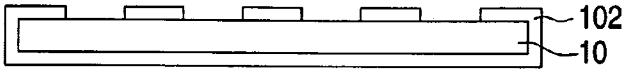

FIG. 17G: Resist removal: The residual resist is removed by use of a separating agent containing an organic solvent or by use of oxygen plasma.

Figure 17H:
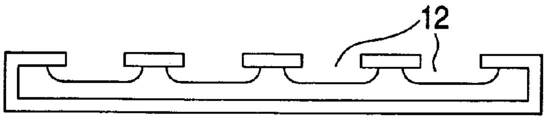

FIG. 17H: Silicon etching formation step: The recess of the present invention is formed by wet etching or dry etching.

In the case of the wet etching, the substrate is etched to a predetermined depth (a depth suitable as the depth of the pressurizing chamber substrate after it has been formed; e.g., a depth such that the thickness of the wafer becomes 150 μm after the wafer has been etched) by use of a liquid mixture comprising, e.g., 18% hydrofluoric acid, 30% nitrate, and 10% acetic acid.

Differences arise in the etch rate when silicon crystal is etched using an alkaline solution. Therefore, provided that silicon crystal etching using an alkaline solution, the surface of the wafer may become irregular after the etching operation even if the surface is smooth in its initial state. For example, a height difference of about 5 μm and the pitch difference between 5–10 μm or thereabout occur. For this reason, attention must be paid in the case where the wafer is etched using an alkaline solution.

Figure 17I:

FIG. 17I: Thermal oxide film etching step: Horizontal portions of the thermal oxide film as shown in FIG. 17H are produced as a result of etching the silicon. To obviate these horizontal portions, the thermal oxide film in the overall wafer are etched using a solution of hydrofluoric acid.

Figure 17J:
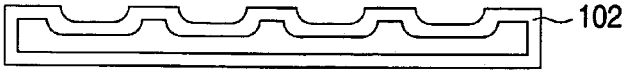

FIG. 17J: Film-to-be-processed formation step: The thermal oxide film is again formed over the entire wafer to the thickness between 1 to 2 μm in the same method as used in the step shown in FIG. 17B.

Through the previously-described recess formation steps, a plurality of recesses 12 are formed in the substrate.

(Piezoelectric Thin-film Element Formation Step)

As described above, it is difficult to form a resist having a uniform thickness because irregularities are formed in the surface of the substrate as a result of formation of the recesses 12. For this reason, a photolithography method is used in the present aspect of the invention, wherein a resist is applied to the wafer by use of a roller, etc., in the manner similar to the offset printing method.

FIGS. 18A to 18F show steps of forming a piezoelectric thin-film element.

Figure 18A:
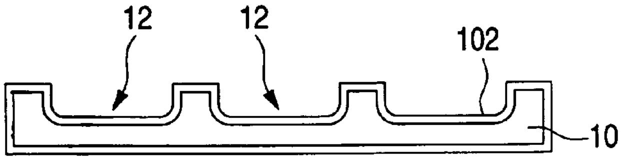
FIGS. 18A to 18F are cross-sectional views of manufacturing steps (piezoelectric thin-film element formation step) of taken across the plane perpendicular to the longitudinal direction of the pressurizing chamber of the third aspect.

FIG. 18A: Oscillating plate film formation step: A thermal oxide film formed over the entire wafer acts as the oscillating plate film 102. This step is the same as the step shown in FIG. 17J, but it is different from the step in FIG. 17J only in expression.

Figure 18B:
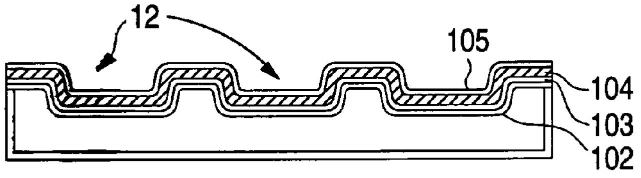

FIG. 18B: Piezoelectric thin-film formation step: A piezoelectric thin-film element is formed on the oscillating plate film 102 having recesses formed thereon. The piezoelectric thin-film element comprises a piezoelectric thin film sandwiched between upper and lower electrode layers. The lower electrode 103, the upper electrode 105, and the piezoelectric film 104 are the same as those of the first aspect of the invention in composition. Further, the step of thermally processing the piezoelectric film precursor is also the same as that of the first aspect of the present invention.

Figure 18C:
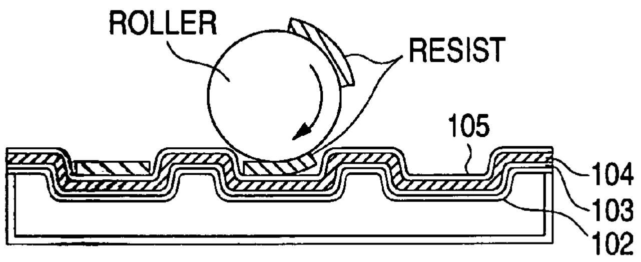

FIG. 18C: Resist formation step: Since the surface of the substrate is irregular, it is impossible to uniformly coat the surface with a resist using the conventional spraying method. Therefore, a roll coating method is adopted in order to apply the resist to the recesses 12. In this method, a roller is used to apply a resist in the manner similar to the offset printing method. The roller is made from an elastic substance such as rubber. The resist corresponding to the shape of the recess is transferred to the roller by the technique similar to the offset printing technique. This roller is brought into close contact with the substrate 10 and is rotated, whereby the resist is transferred to the recesses of the substrate 10. If it is possible to uniformly apply the resist to the recesses, another method may be used instead of the roller.

Figure 18D:
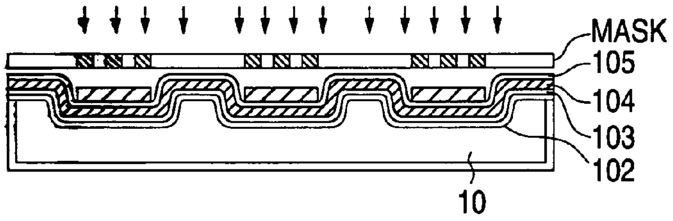

FIG. 18D: Masking and exposure step: The wafer is masked and exposed using the ordinary method (shown in FIG. 3). The mask pattern corresponds to the shape of the electrode.

Figure 18E:
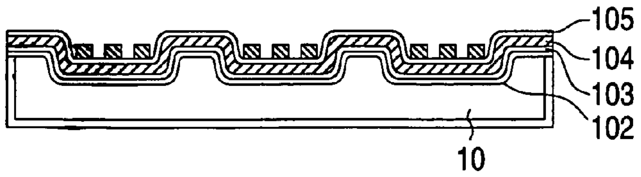

FIG. 18E: Development step: The wafer can be also developed using the ordinary method. Positive development of the wafer is carried out herein.

Figure 18F:
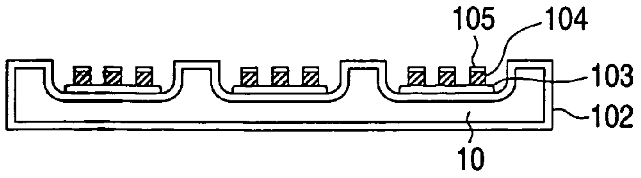

FIG. 18F: Etching step: Unnecessary electrodes are removed by ion milling or dry etching. The electrodes of the piezoelectric thin-film element are completed after removal of the resist.

The space of the pressurizing chamber on the reverse side of the substrate is anisotropically etched using; e.g., anisotropic wet etching or the parallel plate reactive ion etching method which uses active gas. As a result, the formation of the pressurizing chamber substrates 1 is now completed. The formation of the pressurizing chamber can be considered to be the same as that of the previously-described second aspect of the present invention.

(Structure of Pressuring Chamber Substrate)

Figure 19:
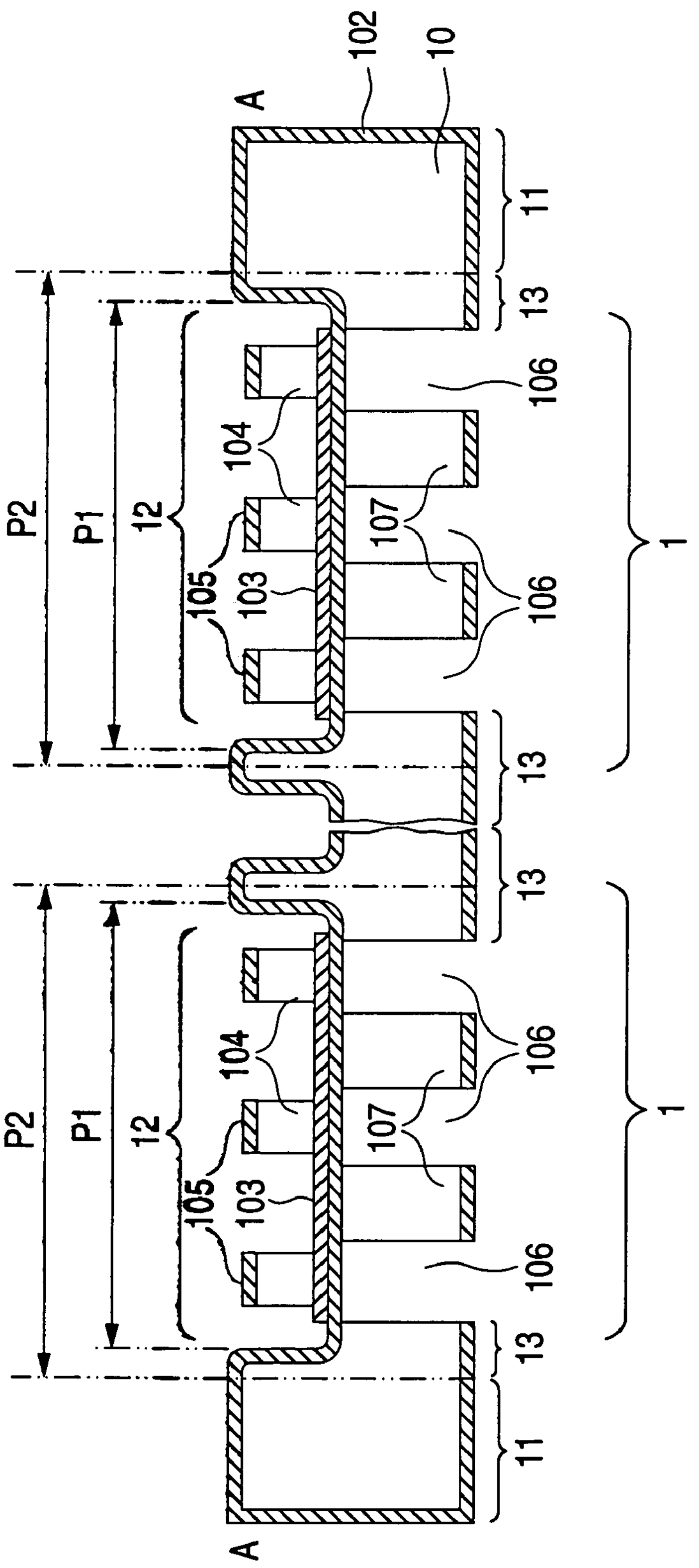
FIG. 19 is a cross-sectional view of the silicon monocrystalline substrate of taken across the plane perpendicular to the longitudinal direction of the pressurizing-chamber of the third aspect.
Figure 20:
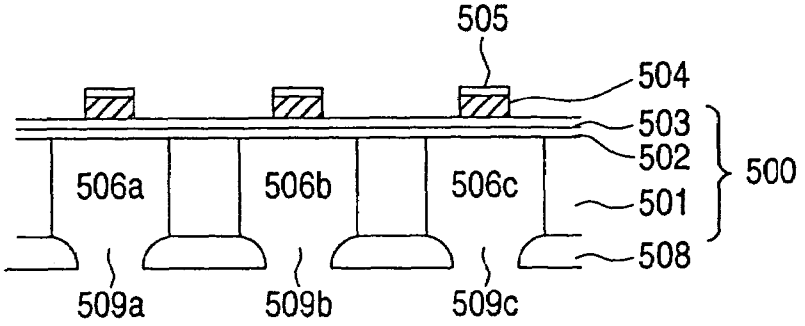
Prior Art FIG. 20
FIG. 20 is a cross-sectional view of a conventional pressurizing chamber substrate taken across the plane perpendicular to the longitudinal direction of the pressurizing chamber.
Figure 21:
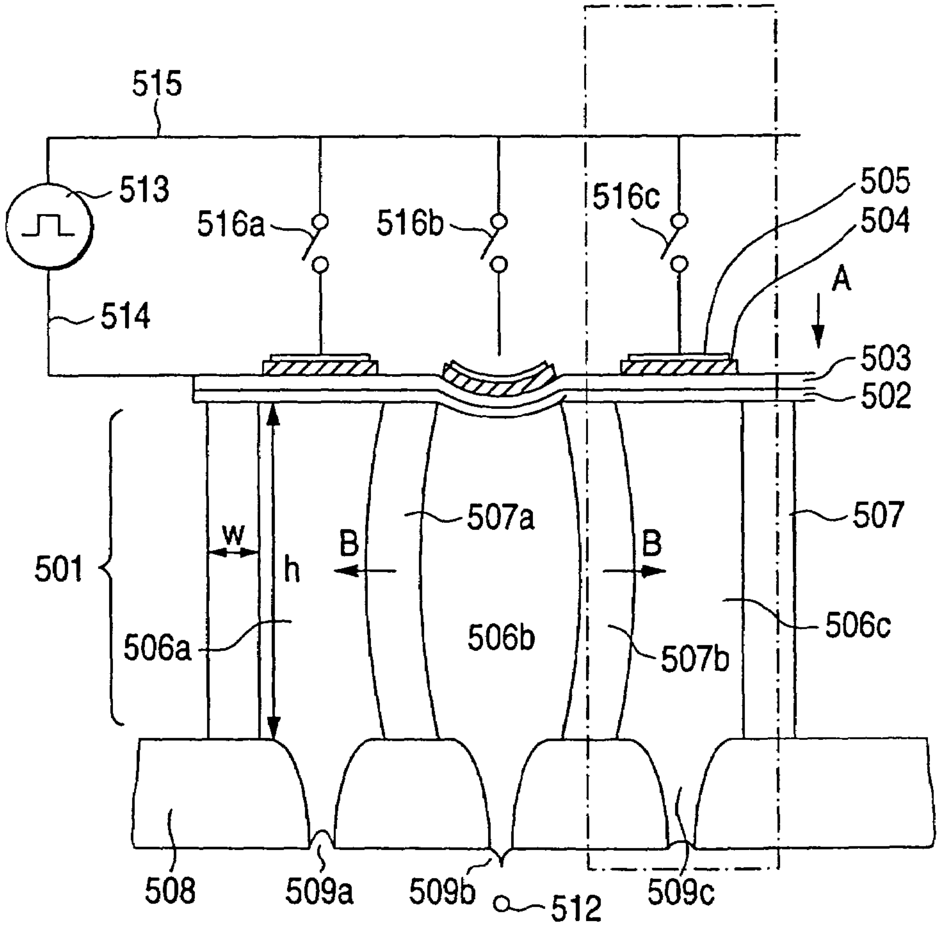
Prior Art FIG. 21
FIG. 21 is a schematic representation of the operating principle and the problem of the conventional pressurizing chamber substrate taken across the plane perpendicular to the longitudinal direction of the pressurizing chamber.

FIG. 19 is a cross-sectional view of the silicon monocrystalline substrate 10 that has finished undergoing formation of the pressurizing chamber substrates according to the previously-described manufacturing method. As shown in the drawing, the recesses 12 are formed in the active element side of the substrate 10. Further, the lower electrode 103 is formed on the oscillating plate film 102, and the piezoelectric thin-film element 104 having the upper electrode 105 laid thereon is formed on the lower electrode 103. The pressurizing chambers 106 are formed in the pressurizing chamber side of the substrate 10 by ion milling, etc. The pressurizing chambers 106 are separated from each other by the side walls 107. If attention is directed to only the recesses 12, it will be acknowledged that there is formed a structure which is the same as that of the pressurizing chamber substrate formed in the conventional silicon wafer having a thickness of 150 $\mu$m.

The separation of the pressurizing chamber substrate 1 from the substrate 10 can be considered to be the same as that of the previously-described second aspect of the present invention. In short, the pressurizing chamber substrate 1 can be separated on pitch P1 shown in FIG. 16 or on pitch P2. The nozzle unit 2 is bonded to the thus-separated pressurizing chamber substrate 1 (see FIGS. 1 and 2).

By virtue of the third aspect of the present invention, the thickness of the substrate can be increased, which in turn enables an increase in the mechanical strength of the substrate. As a result, it becomes easy to handle the substrate during the course of the manufacturing steps.

Further, the height of the side wall can be maintained at the same height as that of the convectional substrate regardless of an increase in the thickness of the substrate, by provision of the recess. Therefore, it is possible to prevent crosstalk from increasing.

Furthermore, an increase in the mechanical strength of the substrate makes it possible to increase the area of the substrate compared with that of a conventional substrate. As a result, an increased number of pressurizing chamber substrates can be formed on one substrate, which results in considerable reduction in manufacturing costs.

As has been described above, reduction in the height of a side wall and an increase in the rigidity of the wall are achieved by the present invention, and hence it is possible to provide a high-resolution ink-jet printing head which prevents crosstalk.

Recesses are formed in either of the sides of a silicon monocrystalline substrate, and hence the thickness of the silicon monocrystalline substrate can be increased. Even if formation of pressurizing chamber substrates in the silicon monocrystalline substrate has finished, a thick peripheral area will remain along the recesses in the form of a matrix pattern on the substrate. Therefore, high rigidity of the substrate itself is ensured. It becomes easy to handle the substrate during the course of manufacturing operations, which in turn makes it possible to improve a production yield.

Moreover, according to the present invention, the mechanical strength of the substrate can be increased, which makes it possible to increase the area of the substrate and form an increased number of pressurizing chamber substrates at one time. Consequently, manufacturing costs can be reduced.

What is claimed is:

1. A method of manufacturing an ink-jet printing head, comprising the steps of:

forming a plurality of channels in one side of a silicon monocrystalline substrate;

forming an oscillating plate film on the bottom of each channel;

forming a piezoelectric thin-film element which comprises a piezoelectric film sandwiched between upper and lower electrodes, on the oscillating plate film; and forming pressurizing chambers in the opposite side of the silicon monocrystalline substrate so as to be opposite to the channels, respectively, wherein the forming step of the piezoelectric thin-film element comprises the steps of:

forming the lower electrode;

forming the piezoelectric film on the lower electrode;

forming the upper electrode on the piezoelectric film; and removing a portion of the upper electrode to make an effective width of the upper electrode narrower than an width of the pressurizing chamber.

2. The manufacturing method for the ink-jet printing head according to claim 1, wherein the forming step of the piezoelectric thin-film element comprises the steps of:

forming a piezoelectric film precursor; and subjecting the piezoelectric film precursor to a heat treatment in an atmosphere including oxygen so as to change the piezoelectric film precursor to the piezoelectric film.

3. The manufacturing method for the ink-jet printing head according to claim 1, wherein the removing step comprises the steps of:

forming a pattern of etching mask material which acts as a mask to an etching substance, in the areas of the upper electrode which are desired to leave; and etching away the areas of the upper electrode that are not covered with the etching mask material.

4. The manufacturing method for the ink-jet printing head according to claim 1, wherein, wherein removing step of:

removing a portion of the upper electrode by irradiating the areas of the upper electrode desired to remove with using a laser beam.

5. A method of manufacturing an ink-jet printing head having a plurality of pressurizing chamber substrates formed on a silicon monocrystalline substrate, each pressurizing chamber substrate having a plurality of pressurizing chambers formed on one side thereof, comprising the steps of:

partitioning the silicon monocrystalline substrate into unit areas to be used in forming the pressurizing chamber substrates, and forming only one recess in the side of the pressurizing chamber substrate in which the pressurizing chambers are to be formed, for each unit area, so as to leave a peripheral area along the circumference of the recess; and further forming the pressurizing chambers in the recess formed in the recess making step, and making the thickness of the peripheral area of the pressurizing chamber substrate greater than the height of a side wall for separating the pressurizing chambers from each other.

6. A method of manufacturing an ink-jet printing head having a plurality of pressurizing chamber substrates formed on a silicon monocrystalline substrate, each pressurizing chamber substrate having a plurality of pressurizing chambers formed on one side thereof, comprising the steps of:

partitioning the silicon monocrystalline substrate into unit areas to be used in forming each of the pressurizing chamber substrates, forming the pressurizing chambers in the side of each of the pressurizing chamber substrates in which the pressurizing chambers are to be formed, while leaving a peripheral area along the circumference of the unit area; and prior to forming the pressurizing chambers, forming a recess in the area of each of the pressurizing chamber substrates where the pressurizing chambers are to be formed, wherein the thickness of the peripheral area of the pressurizing chamber substrate is greater than the height of a side wall for separating the pressurizing chambers from each other.

7. A method of manufacturing an ink-jet printing head having a plurality of pressurizing chamber substrates formed on a silicon monocrystalline substrate, each pressurizing chamber substrate having a plurality of pressurizing chambers formed on one side thereof, comprising the steps of:

partitioning the silicon monocrystalline substrate into unit areas to be used in forming each of the pressurizing chamber substrates, and for each of the pressurizing chamber substrates, forming only one recess in the side of the pressurizing chamber substrate opposite to the side on which the pressurizing chambers are formed in each unit area, while leaving a peripheral area along the circumference of the unit area, wherein the mechanical strength of the silicon monocrystalline substrate is maintained by making the thickness of the pressurizing chamber substrate in the peripheral area greater than the thickness of the pressurizing chamber substrate in the recess.

8. A method of manufacturing an ink-jet printing head having a plurality of pressurizing chamber substrates formed on a silicon monocrystalline substrate, each pressurizing chamber substrate having a plurality of pressurizing chambers formed on one side thereof, comprising the steps of:

making a recess including the steps of, partitioning the silicon monocrystalline substrate into unit areas to be used in forming the pressurizing chamber substrate, forming a recess in the side of the pressurizing chamber substrate opposite to the side on which the pressurizing chambers are formed in each unit area, while leaving a peripheral area along the circumference of the unit area, wherein the mechanical strength of the silicon monocrystalline substrate is maintained by making the thickness of the pressurizing chamber substrate in the peripheral area greater than the thickness of the pressurizing chamber substrate in the recess, forming a layer to be processed;

providing the layer to be processed with a resist and patterning the resist;

etching the layer to be processed corresponding to the recess masked in the resist mask formation step;

further etching the area of the silicon monocrystalline substrate from which the layer to be processed has been removed as a result of the etching step; and forming a layer to be processed in the recess etched in the recess etching step.

9. A method of manufacturing an ink-jet printing head having a plurality of pressurizing chamber substrates formed on a silicon monocrystalline substrate, each pressurizing chamber substrate having a plurality of pressurizing chambers formed on one side thereof, comprising the steps of:

making a recess including the steps of, partitioning the silicon monocrystalline substrate into unit areas to be used in forming the pressurizing chamber substrate, and forming a recess in the side of the pressurizing chamber substrate opposite to the side on which the pressurizing chambers are formed in each unit area, while leaving a peripheral area along the circumference of the unit area, wherein the mechanical strength of the silicon monocrystalline substrate is maintained by making the thickness of the pressurizing chamber substrate in the peripheral area greater than the thickness of the pressurizing chamber substrate in the recess, forming a piezoelectric thin film sandwiched between electrode layers, in the recess formed in the recess forming step;

forming a resist on the piezoelectric thin film formed in the piezoelectric thin-film forming step, by a resilient roller;

exposing the silicon monocrystalline substrate having the resist formed thereon in the resist forming step;

developing the silicon monocrystalline substrate exposed in the exposing step;

etching the piezoelectric thin film having the resist formed thereon in the developing step, so as to form a piezoelectric thin-film element; and forming the pressurizing chambers on the other side of the silicon monocrystalline substrate so as to correspond to the piezoelectric thin-film elements formed in the etching step.

10. A method of manufacturing an ink-jet printing head having a pressurizing chamber substrate formed with a plurality of other pressurizing chamber substrates on a wafer, each pressurizing chamber substrate having a plurality of pressurizing chambers formed on one side thereof, comprising the steps of:

forming only one recess in a first side of the wafer in which the pressurizing chambers are to be formed, so as to leave a peripheral area along the circumference of the recess;

partitioning the wafer into unit areas to be used in forming each pressurizing chamber substrate, and for each partitioned unit area, forming the pressurizing chambers in that part of the recess corresponding to the partitioned unit area.

11. The manufacturing method for the ink-jet printing head according to claim 10, wherein the wafer is a silicon monocrystalline substrate.

12. The manufacturing method for the ink-jet printing head according to claim 10, wherein the wafer has a thickness of approximately 300 $\mu$m.

13. The manufacturing method for the ink-jet printing head according to claim 10, wherein the wafer has a diameter d, such that 4 inches $\leqq$d$\leqq$8 inches.

14. A method of manufacturing an ink-jet printing head having a plurality of pressurizing chamber substrates formed on a silicon monocrystalline substrate, each pressurizing chamber substrate having a plurality of pressurizing chambers formed on one side thereof, comprising the steps of:

making a recess formation including the steps of, partitioning the silicon monocrystalline substrate into unit areas to be used in forming the pressurizing chamber substrate, and forming a recess in the side of the pressurizing chamber substrate in which the pressuring chambers are to be formed, for each unit area, so as to leave a peripheral area along the circumference of the recess; and making a pressurizing chamber formation including the steps of, further forming the pressurizing chambers in the recess formed in the step of forming the recess, and making a thickness of the peripheral area of the pressurizing chamber substrate greater than the height of a side wall for separating the pressurizing chambers from each other, wherein the recess that does not include the peripheral area is separated from the silicon monocrystalline substrate so as to individually separate the pressurizing chamber substrates, when the pressurizing chamber substrate is separated from each unit area after the pressurizing chamber substrates have been formed.

15. A method of manufacturing an ink-jet printing head having a plurality of pressurizing chamber substrates formed on a silicon monocrystalline substrate, each pressurizing chamber substrate having a plurality of pressurizing chambers formed on one side thereof, comprising the steps of:

making a recess formation including the steps of, partitioning the silicon monocrystalline substrate into unit areas to be used in forming the pressurizing chamber substrate, and forming a recess in the side of the pressurizing chamber substrate in which the pressuring chambers are to be formed, for each unit area, so as to leave a peripheral area along the circumference of the recess; and making a pressurizing chamber formation including the steps of, further forming the pressurizing chambers in the recess formed in the step of forming the recess, making a thickness of the peripheral area of the pressurizing chamber substrate greater than the height of a side wall for separating the pressurizing chambers from each other, and wherein the pressurizing chamber substrates are separated from the silicon monocrystalline substrate so as to include the peripheral area, so that the pressurizing chamber substrates are individually separated from each other, when the pressurizing chamber substrate is separated from each unit area after the pressurizing chamber substrates have been formed.

16. A method of manufacturing an ink-jet printing head having a plurality of pressurizing chamber substrates formed on a silicon monocrystalline substrate, each pressurizing chamber substrate having a plurality of pressurizing chambers formed on one side thereof, comprising the steps of:

making a pressurizing chamber including the steps of, partitioning the silicon monocrystalline substrate into unit areas to be used in forming the pressurizing chamber substrate, and forming pressurizing chambers in the side of the pressurizing chamber substrate in which the pressuring chambers are to be formed, while leaving a peripheral area along the circumference of the unit area; and making a recess including the steps of, further forming a recess in the area where the pressurizing chambers are formed in the pressurizing chamber formation step, and making a thickness of the peripheral area of the pressurizing chamber substrate greater than the height of a side wall for separating the pressurizing chambers from each other, wherein the recess that does not include the peripheral area is separated from the silicon monocrystalline substrate so as to individually separate the pressurizing chamber substrates, when the pressurizing chamber substrate is separated from each unit area after the pressurizing chamber substrates have been formed.

17. A method of manufacturing an ink-jet printing head having a plurality of pressurizing chamber substrates formed on a silicon monocrystalline substrate, each pressurizing chamber substrate having a plurality of pressurizing chambers formed on one side thereof, comprising the steps of:

making a pressurizing chamber including the steps of, partitioning the silicon monocrystalline substrate into unit areas to be used in forming the pressurizing chamber substrate, and forming pressurizing chambers in the side of the pressurizing chamber substrate in which the pressuring chambers are to be formed, while leaving a peripheral area along the circumference of the unit area; and making a recess including the steps of, further forming a recess in the area where the pressurizing chambers are formed in the pressurizing chamber formation step, making a thickness of the peripheral area of the pressurizing chamber substrate greater than the height of a side wall for separating the pressurizing chambers from each other, wherein the pressurizing chamber substrates are separated from the silicon monocrystalline substrate so as to include the peripheral area, so that the pressurizing chamber substrates are individually separated from each other, when the pressurizing chamber substrate is separated from each unit area after the pressurizing chamber substrates have been formed.

18. A method of manufacturing an ink-jet printing head having a plurality of pressurizing chamber substrates formed on a silicon monocrystalline substrate, each pressurizing chamber substrate having a plurality of pressurizing chambers formed on one side thereof, comprising the steps of:

making a recess including the steps of, partitioning the silicon monocrystalline substrate into unit areas to be used in forming the pressurizing chamber substrate, and forming the recess in the side of the pressurizing chamber substrate opposite to the side on which the pressurizing chambers are formed in each unit area, while leaving a peripheral area along the circumference of the unit area, wherein the mechanical strength of the silicon monocrystalline substrate is maintained by making the thickness of the pressurizing chamber substrate in the peripheral area greater than the thickness of the pressurizing chamber substrate in the recess, wherein the recess that does not include the peripheral area is separated from the silicon monocrystalline substrate so as to individually separate the pressurizing chamber substrates, when the pressurizing chamber substrate is separated from each unit area after the pressurizing chamber substrates have been formed.

19. A method of manufacturing an ink-jet printing head having a plurality of pressurizing chamber substrates formed on a silicon monocrystalline substrate, each pressurizing chamber substrate having a plurality of pressurizing chambers formed on one side thereof, comprising the steps of:

making a recess including the steps of, partitioning the silicon monocrystalline substrate into unit areas to be used in forming the pressurizing chamber substrate, and forming the recess in the side of the pressurizing chamber substrate opposite to the side on which the pressurizing chambers are formed in each unit area, while leaving a peripheral area along the circumference of the unit area, wherein the mechanical strength of the silicon monocrystalline substrate is maintained by making the thickness of the pressurizing chamber substrate in the peripheral area greater than the thickness of the pressurizing chamber substrate in the recess, wherein the pressurizing chamber substrates are separated from the silicon monocrystalline substrate so as to include the peripheral area, so that the pressurizing chamber substrates are individually separated from each other, when the pressurizing chamber substrate is separated from each unit area after the pressurizing chamber substrates have been formed.

20. The manufacturing method for the ink-jet printing head according to any one of claims 8 through 9, further comprising the step of:

separating the recess that does not include the peripheral area from the silicon monocrystalline substrate so as to individually separate the pressurizing chamber substrates, when the pressurizing chamber substrate is separated from each unit area after the pressurizing chamber substrates have been formed.

21. The manufacturing method for the ink-jet printing head according to any one of claims 8 through 9, further comprising the step of:

separating the pressurizing chamber substrates from the silicon monocrystalline substrate so as to include the peripheral area, so that the pressurizing chamber substrates are individually separated from each other, when the pressurizing chamber substrate is separated from each unit area after the pressurizing chamber substrates have been formed.

* * * * *